(12) United States Patent
Yano et al.

(10) Patent No.: US 9,512,304 B2
(45) Date of Patent: Dec. 6, 2016

(54) METHOD FOR PRODUCING RESIN COMPOSITION COMPRISING MODIFIED MICROFIBRILLATED PLANT FIBERS, AND SAME RESIN COMPOSITION

(71) Applicants:DIC Corporation, Tokyo (JP); Seiko PMC Corporation, Tokyo (JP); Kyoto University, Kyoto-shi (JP); Kyoto Municipal Institute of Industrial Technology and Culture, Kyoto-shi (JP)

(72) Inventors: Hiroyuki Yano, Uji (JP); Akihiro Sato, Uji (JP); Tomoaki Yoshimura, Uji (JP); Yuko Igarashi, Uji (JP); Daisuke Kabusaki, Uji (JP); Fumiaki Nakatsubo, Uji (JP); Hiroaki Okumura, Uji (JP); Takeshi Semba, Kyoto (JP); Kazuo Kitagawa, Kyoto (JP); Hiromasa Kataoka, Uji (JP); Kazuhiro Shintani, Uji (JP)

(73) Assignees: DIC Corporation, Tokyo (JP); Seiko PMC Corporation, Tokyo (JP); Kyoto University, Kyoto-shi (JP); Kyoto Municipal Institute of Industrial Technology and Culture, Kyoto-shi (JP)

( * ) Notice: Subject to any disclaimer, the term of this patent is extended or adjusted under 35 U.S.C. 154(b) by 47 days.

(21) Appl. No.: 14/383,230

(22) PCT Filed: Feb. 26, 2013

(86) PCT No.: PCT/JP2013/055022
§ 371 (c)(1),
(2) Date: Nov. 14, 2014

(87) PCT Pub. No.: WO2013/133093
PCT Pub. Date: Sep. 12, 2013

(65) Prior Publication Data
US 2015/0105499 A1 Apr. 16, 2015

(30) Foreign Application Priority Data
Mar. 9, 2012 (JP) ................. 2012-053828

(51) Int. Cl.
| C08L 1/10 | (2006.01) |
| C08B 3/12 | (2006.01) |
| D06M 13/192 | (2006.01) |
| C08J 3/20 | (2006.01) |
| C08J 3/205 | (2006.01) |
| C08L 101/00 | (2006.01) |
| C08B 3/16 | (2006.01) |

(Continued)

(52) U.S. Cl.
CPC . *C08L 1/10* (2013.01); *C08B 3/12* (2013.01); *C08B 3/16* (2013.01); *C08J 3/20* (2013.01); *C08J 3/205* (2013.01); *C08J 3/226* (2013.01); *C08J 5/00* (2013.01); *C08L 23/02* (2013.01); *C08L 23/04* (2013.01); *C08L 23/06* (2013.01); *C08L 23/10* (2013.01); *C08L 23/12* (2013.01); *C08L 59/00* (2013.01); *C08L 59/02* (2013.01); *C08L 77/02* (2013.01); *C08L 97/005* (2013.01); *C08L 101/00* (2013.01); *D06M 13/192* (2013.01); *C08J 2323/06* (2013.01); *C08J 2423/06* (2013.01); *C08L 2201/08* (2013.01); *C08L 2205/16* (2013.01); *C08L 2207/062* (2013.01); *D06M 2101/06* (2013.01)

(58) Field of Classification Search
CPC ........ C08L 1/10; C08B 3/12; D06M 13/192; D06M 2101/08
See application file for complete search history.

(56) References Cited

U.S. PATENT DOCUMENTS

| 4,737,582 A * | 4/1988 | Goldman ............... A61L 15/225 |
| | | 106/162.5 |
| 4,857,588 A * | 8/1989 | Coleman-Kammula D06M 14/04 |
| | | 525/54.2 |

(Continued)

FOREIGN PATENT DOCUMENTS

| JP | 2001-181513 A | 7/2001 |
| JP | 2003-527493 A | 9/2003 |

(Continued)

OTHER PUBLICATIONS

Acha et al., Polymer Engineering and Science, May 2003, vol. 43, No. 5, 999-1010.*

(Continued)

*Primary Examiner* — Liam J Heincer
(74) *Attorney, Agent, or Firm* — Locke Lord LLP; James E. Armstrong, IV; Nicholas J. DiCeglie, Jr.

(57) ABSTRACT

The present invention provides a method for producing a resin composition, which, by means of simple steps, can uniformly disperse microfibrillated plant fiber in a highly hydrophobic resin and can impart enhanced mechanical strength to a molding material obtained by molding the resin composition. The present invention further provides a resin composition having excellent heat resistance and low linear thermal expansion. The present invention relates to a method for producing a resin composition, the method including a step of mixing a thermoplastic resin or thermosetting resin (A), and modified plant fiber (b) or modified microfibrillated plant fiber (B), in the presence of an organic liquid (C), the modified plant fiber (b) or modified microfibrillated plant fiber (B) being obtained by modification with an alkyl or alkenyl succinic anhydride in a liquid capable of swelling microfibrillated plant fiber (B') or plant fiber (b).

23 Claims, 8 Drawing Sheets

(51) Int. Cl.
    *C08J 5/00*              (2006.01)
    *C08L 23/06*           (2006.01)
    *C08L 23/12*           (2006.01)
    *C08L 59/02*           (2006.01)
    *C08L 23/02*           (2006.01)
    *C08L 23/04*           (2006.01)
    *C08L 23/10*           (2006.01)
    *C08L 77/02*           (2006.01)
    *C08J 3/22*             (2006.01)
    *C08L 59/00*           (2006.01)
    *C08L 97/00*           (2006.01)
    *D06M 101/06*         (2006.01)

(56) References Cited

U.S. PATENT DOCUMENTS

| | | | | |
|---|---|---|---|---|
| 5,008,385 A * | 4/1991 | Diamantoglou | B01D 71/12 | 264/187 |
| 5,104,486 A * | 4/1992 | Sweeney | D21H 17/16 | 162/158 |
| 5,717,087 A * | 2/1998 | Kalbe | A61K 9/2054 | 424/488 |
| 6,090,486 A * | 7/2000 | Riffle | C08G 8/10 | 428/373 |
| 6,372,035 B1 * | 4/2002 | Juppo | D21H 1/16 | 106/164.4 |
| 6,627,750 B2 * | 9/2003 | Wang | A61L 24/0042 | 428/364 |
| 8,664,350 B2 * | 3/2014 | Thetford | C09C 1/3072 | 524/1 |
| 2002/0059886 A1 * | 5/2002 | Merkley | C04B 18/24 | 106/805 |
| 2003/0054167 A1 * | 3/2003 | Wang | A61L 24/0042 | 428/364 |
| 2005/0003223 A1 * | 1/2005 | Koga | A63F 1/02 | 428/537.5 |
| 2005/0208235 A1 * | 9/2005 | Murai | G03G 7/0026 | 428/32.38 |
| 2005/0215672 A1 * | 9/2005 | Mohanty | C08F 283/00 | 524/9 |
| 2006/0014640 A1 * | 1/2006 | Tani | B41M 5/41 | 503/227 |
| 2006/0060814 A1 * | 3/2006 | Pawlowska | D06M 13/192 | 252/8.83 |
| 2006/0094798 A1 * | 5/2006 | Cotter | C08G 73/022 | 523/402 |
| 2007/0032576 A1 * | 2/2007 | Lundquist | C08G 59/12 | 523/400 |
| 2009/0054552 A1 * | 2/2009 | Yano | C08J 5/06 | 523/200 |
| 2009/0272505 A1 * | 11/2009 | Champ | D21H 19/66 | 162/134 |
| 2009/0298976 A1 * | 12/2009 | Yano | C08J 5/045 | 524/35 |
| 2010/0186917 A1 * | 7/2010 | Simonson | C08L 1/286 | 162/175 |
| 2010/0206504 A1 * | 8/2010 | Akiyama | D21H 13/50 | 162/181.9 |
| 2010/0209725 A1 * | 8/2010 | Kataja | D21H 19/54 | 428/533 |
| 2010/0272980 A1 * | 10/2010 | Kowata | C08B 11/02 | 428/220 |
| 2011/0054192 A1 * | 3/2011 | De Jong | C07D 307/60 | 549/233 |
| 2011/0117319 A1 * | 5/2011 | Yano | D21H 11/08 | 428/141 |
| 2011/0183076 A1 * | 7/2011 | Silventoinen | B05D 5/08 | 427/416 |
| 2011/0220306 A1 * | 9/2011 | Propst, Jr. | D21H 1/16 | 162/4 |
| 2011/0230655 A1 * | 9/2011 | Moulijn | C08B 1/003 | 536/37 |
| 2011/0263756 A1 * | 10/2011 | Yano | C08J 5/045 | 524/13 |
| 2012/0080156 A1 * | 4/2012 | Laleg | D21H 11/18 | 162/158 |
| 2012/0214911 A1 * | 8/2012 | Yano | C08L 23/02 | 524/13 |
| 2013/0005866 A1 * | 1/2013 | Yano | B29B 15/08 | 524/13 |
| 2014/0299019 A1 * | 10/2014 | Wu | D01F 2/28 | 106/501.1 |
| 2015/0148460 A1 * | 5/2015 | Senba | C08L 1/04 | 524/35 |
| 2015/0166741 A1 * | 6/2015 | Ikuma | C08J 3/22 | 524/37 |

FOREIGN PATENT DOCUMENTS

| | | |
|---|---|---|
| JP | 2005-526148 A | 9/2005 |
| JP | 2008-248441 A | 10/2008 |
| JP | 2008-308524 A | 12/2008 |
| JP | 2010-106251 A | 5/2010 |
| JP | 2011-105799 A | 6/2011 |
| JP | 2011-213754 A | 10/2011 |
| JP | 2012-025949 A | 2/2012 |
| JP | 2012-214563 A | 11/2012 |
| JP | 2012-229350 A | 11/2012 |
| WO | WO-01/44575 A1 | 6/2001 |
| WO | WO-03/016356 A1 | 2/2003 |

OTHER PUBLICATIONS

International Search Report dated May 28, 2013, issued for PCT/JP2013/055022.

* cited by examiner

Production Method (I)

Production Method (II)

Production Method (III)

METHOD FOR PRODUCING RESIN COMPOSITION COMPRISING MODIFIED MICROFIBRILLATED PLANT FIBERS, AND SAME RESIN COMPOSITION

TECHNICAL FIELD

The present invention relates to a method for producing a resin composition comprising microfibrillated plant fiber modified with an alkyl or alkenyl succinic anhydride, and to the resin composition.

BACKGROUND ART

Microfibrillated plant fibers are widely known as reinforcing materials for resins due to their excellent properties, such as light weight, high strength, high modulus, and low linear thermal expansion. However, microfibrillated plant fibers, which are very highly hydrophilic, have poor compatibility with highly hydrophobic resins, such as polypropylene and polyethylene, and cannot be uniformly mixed by mere mechanical kneading using a twin-screw extruder or the like, and the resulting composite material does not have good mechanical properties.

Therefore, many attempts have been made to improve dispersibility of microfibrillated plant fibers in resin by hydrophobically modifying the microfibrillated plant fibers, as disclosed in Patent Literature (PTL) 1 to 3.

Patent Literature 1 discloses a hydrophobically modified microfibrillated plant fiber obtained by esterifying pulp with acid halide and subjecting the resulting hydrophobically modified pulp to bead milling in an aqueous medium. Further, the obtained hydrous hydrophobically modified microfibrillated plant fiber is kneaded with a resin to produce a composite material composed of the hydrophobically modified microfibrillated plant fiber and resin.

When such a hydrous hydrophobically modified microfibrillated plant fiber is mixed with a resin, the hydrophobically modified microfibrillated plant fiber is not fully dispersed in the resin due to the water it contains, and the resulting composite material does not have sufficient mechanical properties, such as tensile strength and modulus.

Patent Literature 2 discloses modifying cellulosic fibers in an aqueous system. Because microfibrillated plant fibers are very highly cohesive, it is difficult to completely uniformly disperse the microfibrillated plant fibers even in water that has relatively high compatibility. Therefore, even when either cellulose fibers or microfibrillated plant fibers are hydrophobized in an aqueous system, only a slight surface of the fibers can be hydrophobically modified. Accordingly, when shearing force is applied during kneading, hydrophobically unmodified cellulose surfaces are formed. This makes it difficult to fully disperse the cellulose fibers in resin. Further, because the hydrophobically unmodified cellulose surfaces become locations of connection failure and are susceptible to destruction, a composite material with excellent mechanical strength cannot be obtained.

In Patent Literature 3, microfibrillated plant fibers are modified in toluene, which is poor in terms of cellulose swellability, and the modification is not performed in a cellulose swelling solvent as used in the present invention. Therefore, uniform modification of the microfibrillated plant fiber surface is difficult. Accordingly, as in PTL 2, the microfibrillated plant fibers are not fully dispersed in a resin, thus failing to provide a composite material with excellent mechanical properties.

Therefore, when a highly hydrophobic thermoplastic resin, such as polyethylene or polypropylene, is used to produce a molding material comprising microfibrillated plant fibers, the microfibrillated plant fibers are poorly dispersed in the resin, and enhanced mechanical strength is very difficult to achieve.

CITATION LIST

Patent Literature

PTL 1: JP2011-213754A
PTL 2: JP2010-106251A
PTL 3: JP2011-105799A

SUMMARY OF INVENTION

Technical Problem

A primary object of the present invention is to provide a method for producing a resin composition, which, by means of simple steps, can uniformly disperse microfibrillated plant fiber in a highly hydrophobic resin and can impart enhanced mechanical strength to a molding material obtained by molding the resin composition.

Solution to Problem

The present inventors conducted extensive research to achieve the above object. As a result, the inventors found that when modified plant fiber or modified microfibrillated plant fiber obtained by esterification with an alkyl or alkenyl succinic anhydride in a liquid capable of swelling plant fiber or microfibrillated plant fiber is mixed with a thermoplastic resin or thermosetting resin in the presence of an organic liquid and then kneaded, dispersibility of the modified microfibrillated plant fiber can be enhanced and the obtained molding material can have enhanced mechanical strength.

The invention has been accomplished based on the above finding and further research. Specifically, the present invention provides the following methods for producing resin compositions, and resin compositions.

Item 1. A method for producing a resin composition comprising the step of:
(1) mixing a thermoplastic resin or thermosetting resin (A) with modified microfibrillated plant fiber (B) or modified plant fiber (b) in the presence of an organic liquid (C), the modified microfibrillated plant fiber (B) or modified plant fiber (b) being obtained by modification with an alkyl or alkenyl succinic anhydride in a liquid capable of swelling microfibrillated plant fiber (B') or plant fiber (b').

Step (1) above includes mixing a thermoplastic resin or thermosetting resin (A) with modified microfibrillated plant fiber (B) in the presence of an organic liquid (C), the modified microfibrillated plant fiber (B) being obtained by modifying microfibrillated plant fiber (B') with an alkyl or alkenyl succinic anhydride in a liquid capable of swelling the microfibrillated plant fiber (B'), and includes mixing a thermoplastic resin or thermosetting resin (A) with a modified plant fiber (b) in the presence of an organic liquid (C), the modified plant fiber (b) being obtained by modifying plant fiber (b') with an alkyl or alkenyl succinic anhydride in a liquid capable of swelling the plant fiber (b').

Item 2. The method according to Item 1, further comprising the step of (2) kneading the mixture obtained in step (1).
Item 3. The method according to Item 2, wherein the modified microfibrillated plant fiber (B) or modified plant fiber (b) in step (1) is modified plant fiber (b), and during the kneading in step (2), the modified plant fiber (b) is defibrated in the thermoplastic resin or thermosetting resin (A) and the modified microfibrillated plant fiber (B) is dispersed in the thermoplastic resin or thermosetting resin (A).

Item 4. A method for producing a resin composition comprising the steps of:

(1) mixing a thermoplastic resin or thermosetting resin (A) with modified plant fiber (b) in the presence of water (C'), the modified plant fiber (b) being obtained by modification with an alkyl or alkenyl succinic anhydride in a liquid capable of swelling plant fiber (b'); and (2) further kneading the mixture obtained in step (1), wherein during the kneading in step (2), the modified plant fiber (b) is defibrated in the thermoplastic resin or thermosetting resin (A), and the modified microfibrillated plant fiber (B) is dispersed in the thermoplastic resin or thermosetting resin (A).

Item 5. The method for producing a resin composition according to any one of Items 1 to 4, wherein the liquid capable of swelling microfibrillated plant fiber (B') or plant fiber (b') is at least one member selected from the group consisting of amide solvents and sulfoxide solvents.

Item 6. The method for producing a resin composition according to any one of Items 1 to 3 and 5, wherein the organic liquid (C) is at least one member selected from the group consisting of lower alcohols, esters, hydrocarbons, ketones, and ethers.

Item 7. The method for producing a resin composition according to any one of Items 1 to 6, wherein carboxyl group in the modified microfibrillated plant fiber (B) or modified plant fiber (b) is unmodified or modified into a carboxylate, carboxyamide, or alkoxycarbonyl group.

Item 8. The method for producing a resin composition according to Item 7, wherein the carboxylate is an alkaline earth metal salt.

Item 9. The method for producing a resin composition according to any one of Items 1 to 8, wherein the amount of the modified microfibrillated plant fiber (B) or modified plant fiber (b) is 0.1 to 1,000 parts by mass per 100 parts by mass of the thermoplastic resin or thermosetting resin (A).

Item 10. The method for producing a resin composition according to any one of Items 2 to 9, wherein step (2) is a step in which the mixture obtained in step (1) is further kneaded in the presence of an antioxidant.

Item 11. The method for producing a resin composition according to any one of Items 1 to 10, wherein the modified microfibrillated plant fiber (B) or modified plant fiber (b) in step (1) is obtained by subjecting the microfibrillated plant fiber (B') or plant fiber (b') to modification with the alkyl or alkenyl succinic anhydride and to acylation.

Item 12. A resin composition produced by using the method according to any one of Items 1 to 11.

Item 13. A resin molding material comprising the resin composition according to Item 12.

Item 14. A resin molded article obtained by molding the resin molding material according to Item 13.

Item 15. A modified microfibrillated plant fiber (B) or modified plant fiber (b) obtained by subjecting microfibrillated plant fiber (B') or plant fiber (b') to modification with an alkyl or alkenyl succinic anhydride and to acylation.

Item 16. A resin composition comprising a thermoplastic resin and modified microfibrillated plant fiber (B), the modified microfibrillated plant fiber (B) being obtained by modifying microfibrillated plant fiber (B') with an alkyl or alkenyl succinic anhydride, the thermoplastic resin in the resin composition being in the form of lamellae that are layered in a direction different from the fiber length direction of the modified microfibrillated plant fiber (B).

Item 17. A resin composition comprising a thermoplastic resin and modified microfibrillated plant fiber (B), the modified microfibrillated plant fiber (B) being obtained by modifying microfibrillated plant fiber (B') with an alkyl or alkenyl succinic anhydride, the thermoplastic resin in the resin composition being in the form of lamellae that are layered in a direction different from the fiber length direction of the modified microfibrillated plant fiber (B), the composition comprising resin fibrous cores that are uniaxially oriented in the fiber length direction of the modified microfibrillated plant fiber (B), the resin lamellae being layered between the modified microfibrillated plant fiber (B) and the fibrous cores in a direction different from the fiber length direction of the modified microfibrillated plant fiber (B).

Item 18. The resin composition according to Item 16 or 17, wherein the modified microfibrillated plant fiber (B) is obtained by subjecting the microfibrillated plant fiber (B') to modification with the alkyl or alkenyl succinic anhydride and to acylation.

Item 19. A resin composition comprising a thermoplastic resin, and modified microfibrillated plant fiber (B) and/or modified plant fiber (b), the modified microfibrillated plant fiber (B) and modified plant fiber (b) being obtained by subjecting microfibrillated plant fiber (B') and/or plant fiber (b') to modification with an alkyl or alkenyl succinic anhydride and to acylation.

Item 20. The resin composition according to any one of Items 16 to 19, wherein the thermoplastic resin is at least one resin selected from the group consisting of polyolefin resins, polyamide resins, polyester resins, and polyacetal resins.

Item 21. The resin composition according to Item 20, wherein the polyolefin resins are polyethylenes.

Item 22. The resin composition according to any one of Items 16 to 21, further comprising an antioxidant.

Item 23. A resin molding material comprising the resin composition according to any one of Items 16 to 22.

Item 24. A resin molded article obtained by molding the resin molding material according to Item 23.

The present invention is described below in detail.

The method for producing a resin composition comprises a step of mixing a thermoplastic resin or thermosetting resin (A) with modified microfibrillated plant fiber (B) or modified plant fiber (b) in the presence of an organic liquid (C) (or in the presence of water (C') under specific conditions), the modified microfibrillated plant fiber (B) or modified plant fiber (b) being obtained by modification with an alkyl or alkenyl succinic anhydride in a liquid capable of swelling microfibrillated plant fiber (B') or plant fiber (b').

Examples of thermoplastic resins include olefin resins, polyamide-based resins, polyacetal resins, polyamide resins, polycarbonate resins, polyester resins, polysulfone resins, and cellulose resins such as triacetyl cellulose and diacetyl cellulose.

Examples of olefin resins include various polyethylene resins (e.g., high-density polyethylene (HDPE), low-density polyethylene (LDPE), and biopolyethylene), polypropylene resins, vinyl chloride resin, styrene resin, (meth)acrylic resin, and vinyl ether resin.

Examples of the polyamide-based resins include polyamide 6 (PA6, a ring-opening polymer of ε-caprolactam), polyamide 66 (PA66, polyhexamethylene adipamide), polyamide 11 (PA11, a polyamide obtained by ring opening and polycondensation of undecanelactam), and polyamide 12 (PA12, a polyamide obtained by ring opening and polycondensation of lauryl lactam).

Examples of the polyester resins include polylactic acid, polycaprolactone, polyethylene terephthalate, polytrimethylene terphthalate, polybutylene terephthalate, and polyethylene naphthalate.

Examples of thermosetting resins include phenol resins, urea resins, melamine resins, unsaturated polyester resins, epoxy resins, diallyl phthalate resins, polyurethane resins, silicone resins, polyimide resins, and like thermosetting resins. These resins may be used singly or in a combination of two or more.

Further, as a compatibilizer, a resin having a polar group introduced by adding maleic anhydride, epoxy, or the like to the above thermoplastic resin or thermosetting resin, such as maleic anhydride-modified polyethylene resins, maleic anhydride-modified polypropylene resins, or various commercially available compatibilizers may be used together. These resins may be used singly or as a mixture of two or more resins. When two or more resins are used as a mixture, a combination of a maleic anhydride-modified resin with another polyolefin resin may be used.

When a mixture of a maleic anhydride-modified resin with another polyolefin resin is used, the proportion of the maleic anhydride-modified resin in the thermoplastic resin or thermosetting resin (A) is preferably about 1 to 40 mass %, and more preferably about 1 to 20 mass %. Specific examples of mixed resins include a mixture of a maleic anhydride-modified polypropylene resin with a polyethylene resin or polypropylene resin, and a mixture of a maleic anhydride-modified polyethylene resin with a polyethylene resin or polypropylene resin.

The modified microfibrillated plant fiber (B) or modified plant fiber (b) can be obtained by modification with an alkyl or alkenyl succinic anhydride in a liquid capable of swelling microfibrillated plant fiber (B') or plant fiber (b').

The modified microfibrillated plant fiber (B) can be obtained by modifying microfibrillated plant fiber (B') with an alkyl or alkenyl succinic anhydride in a liquid capable of swelling the microfibrillated plant fiber (B'). The modified plant fiber (b) can be obtained by modifying plant fiber (b') with an alkyl or alkenyl succinic anhydride in a liquid capable of swelling the plant fiber (b').

Examples of the material containing plant fiber (plant-fiber-containing material), which is used as a raw material of microfibrillated plant fiber (B') or plant fiber (b'), include pulp obtained from a natural plant fiber raw material, such as wood, bamboo, hemp, jute, kenaf, cotton, beat, agricultural waste, and cloth; and regenerated cellulose fiber such as rayon and cellophane. Pulp is a particularly preferable raw material.

Preferable examples of the pulp include chemical pulp (kraft pulp (KP) and sulfite pulp (SP)), semi-chemical pulp (SCP), chemiground pulp (CGP), chemi-mechanical pulp (CMP), ground pulp (GP), refiner mechanical pulp (RMP), thermomechanical pulp (TMP), and chemithermomechanical pulp (CTMP), which are obtained by chemically and/or mechanically pulping plant raw materials; and deinked recycled pulp, cardboard recycled pulp, and magazine recycled pulp, which comprise these plant fibers as main ingredients. These raw materials may optionally be subjected to delignification or bleaching to control the lignin content in the plant fibers.

Among these pulps, various kraft pulps derived from softwood with high fiber strength (softwood unbleached kraft pulp (hereinafter sometimes referred to as "NUKP"), oxygen-prebleached softwood kraft pulp (hereafter sometimes referred to as "NOKP"), and softwood bleached kraft pulp (hereinafter sometimes referred to as "NBKP") are particularly preferably used.

The plant fiber used as a raw material consists mainly of cellulose, hemicellulose, and lignin. The lignin content of the plant-fiber-containing material is generally about 0 to 40 mass %, and preferably about 0 to 10 mass %. The lignin content can be measured by using the Klason method.

The methods for preparing modified microfibrillated plant fiber (B) include a method comprising esterifying the above plant fiber (b') with an alkyl or alkenyl succinic anhydride to prepare modified plant fiber (b), and then defibrating the modified plant fiber (b), or a method comprising defibrating the above plant fiber (b') to prepare microfibrillated plant fiber (B'), and then esterifying the microfibrillated plant fiber (B') with an alkyl or alkenyl succinic anhydride.

A known method can be used as a method of defibrating the modified plant fiber (b) or unmodified plant fiber (b'). For example, a defibration method can be used in which an aqueous suspension or slurry of the plant-fiber-containing material is mechanically milled or beaten using a refiner, a high-pressure homogenizer, a grinder, a single-screw or multi-screw kneader, a bead mill, etc. If necessary, the defibration treatment may be performed by combining the above defibration methods.

If a multi-screw kneader is used, a twin-screw kneader is preferable because, for example, it is readily available.

The lower limit of the peripheral screw speed of the single-screw or multi-screw kneader is typically about 45 m/min. The lower limit of the peripheral screw speed is preferably about 60 m/min, and particularly preferably about 90 m/min. The upper limit of the peripheral screw speed is typically about 200 m/min, preferably about 150 m/min, and particularly preferably about 100 m/min.

The ratio of L/D (ratio of the screw length L to the screw diameter D) of the kneader used in the present invention is typically from about 15 to 60, and preferably from about 30 to 60.

The defibration time using a single-screw or multi-screw kneader varies depending on the kind of plant-fiber-containing material, the L/D of the kneader, and the like. When the L/D is in the above range, the defibration time is typically from about 30 to 60 minutes, and preferably from about 30 to 45 minutes.

The number of defibration treatments (the number of passes) using a kneader varies depending on the fiber diameter and the fiber length of the target microfibrillated plant fiber, the L/D of the kneader, and the like; however, it is typically about 1 to 8 times, and preferably about 1 to 4 times. When the number of passes is too large, cellulose becomes discolored or heat-damaged (sheet strength decreases) because heat generation simultaneously occurs, although defibration proceeds further.

The kneading segment in the screw of the kneader may be composed of one or more kneading segments.

When there are two or more kneading members (section, portion), one or more blocking structures (traps) may be present between the kneading members. In the present invention, since the peripheral screw speed is 45 m/min or more, which is much higher than the conventional peripheral screw speed, in order to decrease the load on the kneader, it is preferable not to include the blocking structure.

As long as the modified plant fiber (b) or unmodified plant fiber (b') can be defibrated, rotation directions of the two screws that compose a twin-screw kneader may be either the same or different. The engagement of the two screws composing a twin-screw kneader may be of complete-engagement screws, incomplete-engagement screws, or non-engagement screws. Complete-engagement screws are preferably used in the defibration of the present invention.

The ratio of the screw length to the screw diameter (screw length/screw diameter) may be from about 20 to 150. Specific examples of the twin-screw kneader include KZW, WDR, and MFU, all produced by Technovel Corporation, TEX produced by Japan Steel Works, Ltd., TEM produced by Toshiba Machine Co., Ltd., ZSK produced by Coperion GmbH, and LCM produced by Kobe Steel, Ltd.

The defibration treatment using a single-screw or multi-screw kneader can be performed by forming a suspension using plant fiber (b') or modified plant fiber (b) and a dispersion medium, and kneading the suspension.

In the defibration treatment using a single-screw or multi-screw kneader, the suspension obtained by mixing the plant fiber and a dispersion medium typically contains plant fiber (b') or modified plant fiber (b) at a solids concentration of about 10 to 70 mass %, and preferably about 20 to 50 mass %. When the solids concentration of plant fiber (b') or modified plant fiber (b) is 10 mass % or more, the plant fiber (b') or modified plant fiber (b) can be uniformly defibrated. However, when the solids concentration of plant fiber (b') or modified plant fiber (b) is 70 mass % or more, the plant fiber (b') or modified plant fiber (b) becomes jammed in a twin-screw kneader during defibration by the kneader, or excessive torque is applied to the twin-screw kneader, resulting in unstable operation of the twin-screw kneader; therefore, such a high concentration is undesirable in terms of both productivity and properties of the obtained microfibrillated plant fiber (B') or modified microfibrillated plant fiber (B).

The temperature during the defibration using the single-screw or multi-screw kneader is not particularly limited. The defibration can be typically performed at 0 to 100° C., and particularly preferably 0 to 50° C.

When plant fiber (b') or modified plant fiber (b) is defibrated with a grinder, the defibration proceeds due to application of shear force, impact force, or centrifugal force that is generated when a slurry comprising plant fiber (b') or modified plant fiber (b) passes between two upper and lower grinding stones. However, an excessively high concentration of plant fiber (b') or modified plant fiber (b) results in clogging, whereas an excessively low concentration allows plant fiber (b') or modified plant fiber (b) to pass between the grinding stones without receiving shear force. Therefore, the plant fiber (b') or modified plant fiber (b) is usually diluted with a dispersion medium to a concentration of 0.1 to 5.0 mass %, preferably 0.1 to 2 mass %, and more preferably about 0.5 to 1.5 mass %, then placed as a slurry into a grinder and defibrated. The temperature of the slurry is increased by the load during defibration. When the microfibrillated plant fiber having a desired degree of defibration is not obtained in one pass, the grinder treatment is performed repeatedly to obtain a microfibrillated plant fiber (B') or modified microfibrillated plant fiber (B) with the desired degree of defibration. Specifically, commercially available devices, such as a Supermasscolloider produced by Masuko Sangyo Co., Ltd., and a Pure Fine Mill produced by Kurita Machinery Mfg. Co., Ltd., can be used.

A method for difibrating plant fiber (b') or modified plant fiber (b) with a bead mill may be, for example, a method comprising forming a suspension by using plant fiber (b') or modified plant fiber (b) and a dispersion medium, and defibrating the suspension. Examples of usable dispersion mediums are the same as those used for the defibration treatment with a single-screw or multi-screw kneader.

The suspension used in the defibration treatment with a bead mill preferably contains plant fiber (b') or modified plant fiber (b) in a solids concentration of about 0.3 to 2 mass %, more preferably about 0.5 to 1.8 mass %, and even more preferably about 0.7 to 1.5 mass %. By setting the plant fiber (b') or modified plant fiber (b) content of the suspension to 0.3 mass % or more, abrasion of beads due to collision between the beads can be suppressed and productivity can be increased. By setting the solids concentration of plant fiber (b') or modified plant fiber (b) to 2 mass % or less, viscosity increase can be suppressed and work efficiency can be increased. Further, clogging in the bead mill tank, etc., can be prevented.

The dispersion medium used to prepare a suspension of plant fiber (b') or modified plant fiber (b) that is defibrated by mechanical treatment using a single-screw or multi-screw kneader, a grinder, a bead mill, or the like is not particularly limited as long as it is a liquid capable of dispersing these plant fibers. Examples of the dispersion medium include water, alcohols having 1 to 4 carbon atoms, such as methanol, ethanol, n-propyl alcohol, isopropyl alcohol, and n-butanol, ethers such as ethylene glycol, propylene glycol, polyethylene glycol, ethylene glycol methyl ether, and tetrahydrofuran, and amide solvents such as dimethylformamide, dimethylacetamide, and N-methylpyrrolidone. These solvents can be used singly or in a combination of two or more.

In plant cell walls, a bundle of cellulose microfibrils (single cellulose nanofibers, each having a width of about 4 nm) having a width of about several tens of nanometers is present as the minimum unit. This is a basic structural material (basic element) of plants, and the assembly of the bundles of cellulose microfibrils forms a plant structure. In the present invention, "microfibrillated plant fiber" refers to what is obtained by breaking apart the fibers of a plant-fiber-containing material (e.g., wood pulp) to a nanosize level.

When microfibrillated plant fiber (B') or plant fiber (b') is modified with an alkyl or alkenyl succinic anhydride, the modification is preformed in a liquid capable of swelling the microfibrillated plant fiber (B') or plant fiber (b').

Examples of the liquid capable of swelling the microfibrillated plant fiber (B') or plant fiber (b') include amide solvents such as dimethylformamide, dimethylacetamide, N-methylpyrrolidone (NMP), and hexamethylphosphoric triamide, dimethyl sulfoxide (DMSO). These liquids may be used singly or in a combination of two or more. Among these, NMP, dimethylformamide, dimethylacetamide, and DMSO are more preferable.

As long as the effect of the above solvent is not impaired, one or more organic solvents that do not react with alkyl or alkenyl succinic anhydride may be additionally used together. Examples of the organic solvents include halogen solvents such as methylene chloride, chloroform, and carbon tetrachloride; ketone solvents such as acetone and methyl ethyl ketone (MEK); cyclic ether solvents such as tetrahydrofuran (THF) and dioxane; ether solvents such as those obtained by dimethylation, diethylation, etc., of alcohols such as ethylene glycol, propylene glycol, and polyethylene glycol; nonpolar solvents such as hexane, heptane, benzene, and toluene; and mixed solvents thereof. A mixture of two or more solvents selected from the above may be used.

Examples of the alkyl or alkenyl succinic anhydride include compounds produced using compounds having a $C_{4-30}$ olefin-derived skeleton and a maleic anhydride skeleton.

Specific examples of the alkyl succinic anhydride include octyl succinic anhydride, dodecyl succinic anhydride, hexadecyl succinic anhydride, and octadecyl succinic anhydride. Specific examples of alkenyl succinic anhydrides include pentenyl succinic anhydride, hexenyl succinic anhydride, octenyl succinic anhydride, decenyl succinic anhydride, undecenyl succinic anhydride, dodecenyl succinic anhydride, tridecenyl succinic anhydride, hexadecenyl succinic anhydride, and octadecenyl succinic anhydride. These may be used singly or in a combination of two or more in view of controlling properties such as hydrophobicity and water resistance.

Examples of the $C_{4-30}$ olefin-derived skeleton include thermally degraded polyolefins or olefin polymers having an unsaturated bond at an end. For example, a $C_{4-30}$ thermally degraded polyolefin having an unsaturated bond at an end can be produced by heating a polyolefin having a relatively low molecular weight by using the same method as disclosed in JP2006-316202A.

The thermally degraded polyolefin having an unsaturated bond at an end is preferably a thermally degraded polypropylene. The thermally degraded polypropylene preferably has 9 to 21 carbon atoms, and preferably 12 to 18 carbon atoms. In this case, the alkenyl succinic anhydride is a thermally degraded polyolefin-succinic anhydride.

The olefin polymer having an unsaturated bond at an end is preferably an oligomer of propylene. The oligomer of propylene preferably has 9 to 21 carbon atoms, and more preferably 12 to 18 carbon atoms. In this case, the alkenyl succinic anhydride is a propylene oligomer-succinic anhydride.

Examples of the alkyl succinic anhydride include hydrogenated compounds obtained by adding hydrogen to unsaturated bonds of alkenyl succinic anhydrides as mentioned above.

As long as the alkenyl succinic anhydride modification effect is not impaired, alkyl or alkenyl succinic anhydride-modified microfibrillated plant fiber (B) or alkyl or alkenyl succinic anhydride-modified plant fiber (b) may be further etherified by methylation, ethylation, etc., and/or modified by acylation.

Alternatively, after microfibrillated plant fiber (B') or plant fiber (b') is etherified by methylation, ethylation, etc., and/or modified by acylation, the microfibrillated plant fiber (B') or plant fiber (b') may be modified with an alkyl or alkenyl succinic anhydride.

Apart from the preparation of alkyl or alkenyl succinic anhydride-modified microfibrillated plant fiber (B) or alkyl or alkenyl succinic anhydride-modified plant fiber (b), microfibrillated plant fiber (B') or plant fiber (b') may be etherified by methylation, ethylation, or the like, and/or modified by acylation to prepare modified microfibrillated plant fiber or modified plant fiber, and the modified microfibrillated plant fiber or modified plant fiber may be mixed with the alkyl or alkenyl succinic anhydride-modified microfibrillated plant fiber (B) or alkyl or alkenyl succinic anhydride-modified plant fiber (b).

Examples of functional groups that are introduced for modification by acylation include acetyl, benzoyl, methacryloyl, propanoyl, butanoyl, pentanoyl, hexanoyl, heptanoyl, octanoyl, nonanoyl, decanoyl, undecanoyl, dodecanoyl, myristoyl, palmitoyl, stearoyl, pivaloyl, 2-methacryloyloxy-ethylisocyanoyl, and the like. These can be used singly or in a combination of two or more.

The amount of alkyl or alkenyl succinic anhydride added to esterify the microfibrillated plant fiber (B') or plant fiber (b') with alkyl or alkenyl succinic anhydride is preferably about 0.1 to 200 moles per one mole of glucose units in the cellulose constituting the microfibrillated plant fiber (B') or plant fiber (b'). After an excess of alkyl or alkenyl succinic anhydride is added to the microfibrillated plant fiber (B') or plant fiber (b'), a reaction may be allowed to proceed until a desired degree of substitution (DS) is achieved, and then the reaction may be stopped. Alternatively, by adding the required minimal amount of alkyl or alkenyl succinic anhydride and adjusting the reaction time, temperature, amount of catalyst, etc., a reaction may be allowed to proceed until a desired DS is achieved.

The alkyl or alkenyl succinic anhydride does not have to be completely used to esterify the microfibrillated plant fiber (B') or plant fiber (b'), and a part may remain unreacted.

The reaction temperature for esterifying the microfibrillated plant fiber (B') or plant fiber (b') with an alkyl or alkenyl succinic anhydride is preferably about 20 to 160° C., more preferably about 40 to 120° C., and even more preferably about 60 to 100° C. A higher temperature is preferable in terms of high reaction efficiency of the microfibrillated plant fiber (B') or plant fiber (b') with the alkyl or alkenyl succinic anhydride. On the other hand, an excessively high temperature causes partial degradation of the plant fiber. Therefore, the temperature is preferably within the above range.

If sufficient dehydration is performed, the reaction of the microfibrillated plant fiber (B') or plant fiber (b') with an alkyl or alkenyl succinic anhydride can proceed to some degree by heating without using a catalyst. However, the use of a catalyst is preferable because the esterification reaction can proceed under milder conditions with high efficiency.

Examples of catalysts that can be used in the esterification reaction include acid catalysts such as hydrochloric acid, sulfuric acid, and acetic acid, alkali catalysts, and amine catalysts. Examples of amine catalysts include pyridine compounds such as pyridine and dimethylaminopyridine (DMAP); and tertiary amine compounds such as triethylamine, trimethylamine, and diazabicyclooctane. Among these, pyridine, triethylamine, dimethylaminopyridine (DMAP), and diazabicyclooctane are preferable in view of excellent catalytic activity. Examples of alkali catalysts include alkali or alkaline earth metal salts such as potassium carbonate, sodium carbonate, potassium acetate, and sodium acetate. An alkali catalyst and an amine compound may be used in combination.

The amount of the catalyst may basically be a catalytic amount. However, for example, when a liquid amine compound such as pyridine is used, the compound may be used in a relatively large amount as a solvent as well as a catalyst. For example, the amount of the catalyst may typically be 0.001 to 10 moles per mole of glucose units of cellulose constituting the microfibrillated plant fiber (B') or plant fiber (b'). After addition of an excess of alkyl or alkenyl succinic anhydride to the microfibrillated plant fiber (B') or plant fiber (b'), a reaction may be allowed to proceed until a desired DS is achieved, and then the reaction may be stopped. Alternatively, by adding the required minimal amount of alkyl or alkenyl succinic anhydride and adjusting the reaction time, temperature, etc., a reaction may be allowed to proceed until a desired DS is achieved.

The modified microfibrillated plant fiber (B) or modified plant fiber (b) obtained by using the above method has a carboxyl group and an ester bond formed by a reaction between a hydroxy group in the cellulose and succinic anhydride in the alkyl or alkenyl succinic anhydride. Specifically, the reaction of alkyl or alkenyl succinic anhydride with a hydroxy group forms a half ester of alkyl or alkenyl succinic acid; therefore, a carboxyl group is also introduced into the modified microfibrillated plant fiber (B) or modified plant fiber (b).

The carboxyl group that is present in the modified microfibrillated plant fiber (B) or modified plant fiber (b) may be unmodified, i.e., may be carboxylic acid, or may be modified into a carboxylic acid salt, alkoxycarbonyl group, or carboxyamide group. Examples of the carboxylic acid salt include alkali metal salts such as potassium salts and sodium salts, alkaline earth metal salts such as magnesium salts and calcium salts, and amine salts. In view of enhancing heat resistance of the molded article formed using the resin composition while maintaining its tensile strength and elastic modulus, alkaline earth metal salts are preferable, and calcium salts are more preferable.

The method for modifying the carboxyl group in the modified microfibrillated plant fiber (B) or modified plant fiber (b) into a carboxylic acid salt may be, for example, a method comprising dispersing modified microfibrillated plant fiber (B) or modified plant fiber (b) into a liquid, such as water, and adding a metal salt dispersion while stirring the dispersion.

The alkoxycarbonyl group preferably has about 1 to 20 carbon atoms, and more preferably about 1 to 15 carbon atoms.

The method for modifying the carboxyl group into an alkoxycarbonyl group may be, for example, a method comprising dispersing modified microfibrillated plant fiber (B) or modified plant fiber (b) into a liquid, such as water, and adding an alkyl halide while stirring the dispersion.

The amount of modifying agent (e.g., benzoyl chloride, acetic anhydride, or anhydrous myristic acid) used to etherify and/or acylate the microfibrillated plant fiber (B') or plant fiber (b') is preferably about 0.1 to 200 moles per mole of glucose units of cellulose constituting the microfibrillated plant fiber (B') or plant fiber (b'). After an excess of a modifying agent is added to the microfibrillated plant fiber (B') or plant fiber (b'), a reaction may be allowed to proceed until a desired degree of substitution (DS) is achieved, and then the reaction may be stopped. Alternatively, by adding the required minimal amount of a modifying agent and adjusting the reaction time, temperature, amount of catalyst, etc., a reaction may be allowed to proceed until a desired DS is achieved.

The modifying agent for etherification and/or acylation does not have to be completely used to modify the microfibrillated plant fiber (B') or plant fiber (b'), and a part may remain unreacted.

The reaction temperature for etherification and/or acylating the microfibrillated plant fiber (B') or plant fiber (b') with a modifying agent is preferably about 20 to 160° C., more preferably about 40 to 120° C., and even preferably about 60 to 100° C. A higher temperature is preferable in terms of high reaction efficiency of the microfibrillated plant fiber (B') or plant fiber (b') with an alkyl or alkenyl succinic anhydride. On the other hand, an excessively high temperature causes partial degradation of the plant fiber. Therefore, the temperature is preferably within the above range.

If sufficient dehydration is performed, the reaction of the microfibrillated plant fiber (B') or plant fiber (b') with a modifying agent for etherification and/or acylation can proceed to some degree by heating without using a catalyst. However, the use of a catalyst is preferable because the etherification reaction and/or acylation reaction can proceed under milder conditions with high efficiency. The type and amount of the catalyst used may be the same as mentioned above as the conditions for the esterification reaction.

The amount of the modified microfibrillated plant fiber (B) or modified plant fiber (b) in the resin composition varies depending on the purpose. For example, when the resin composition without change is formed into a molding material, the amount of the modified microfibrillated plant fiber (B) or modified plant fiber (b) is preferably about 0.5 to 80 parts by mass, more preferably about 1 to 70 parts by mass, and even more preferably about 2 to 50 parts by mass, per 100 parts by mass of the resin. An increased amount of the modified microfibrillated plant fiber (B) or modified plant fiber (b) is preferable in terms of increasing the strength and elastic modulus of the obtained molded article, but also reduces fluidity of the resin during molding, which makes it difficult to form the resin into a complicated shape.

After esterification of the microfibrillated plant fiber (B') or plant fiber (b') with an alkyl or alkenyl succinic anhydride, the obtained modified microfibrillated plant fiber (B) or modified plant fiber (b) is washed to remove the residual alkyl or alkenyl succinic anhydride, catalyst, etc. The washing liquid used to wash the modified microfibrillated plant fiber (B) or modified plant fiber (b) may be the same as or different from the organic liquid (C). The washing liquid is preferably the same as the organic liquid (C) from the viewpoint of simplifying the step. Specific examples of the washing liquid include water, lower alcohols such as ethanol and isopropanol, ester solvents such as ethyl acetate, ketones such as acetone and methyl ethyl ketone, ethers such as dioxane, tetrahydrofuran, and ethyleneglycol dimethyl ether, and hydrocarbons such as hexane.

Washing is also performed after the reaction of the microfibrillated plant fiber (B') or plant fiber (b') with a modifying agent (benzoyl chloride, acetic anhydride, anhydrous myristic acid, etc.) for etherification and/or acylation, in order to remove the residual modifying agent, catalyst, etc. The washing liquid used for the washing may be the same as the washing liquid used to remove the residual alkyl or alkenyl succinic anhydride, catalyst, etc.

Further, when an amine catalyst or an alkali compound powder such as potassium carbonate or sodium carbonate is used as a catalyst, neutralization may be performed by using a neutralizing agent. Examples of the neutralizing agent include inorganic acids such as hydrochloric acid, sulfuric acid, and nitric acid; organic acids such as acetic acid; and aqueous solutions thereof. Aqueous acetic acid solution is preferable.

The alkyl or alkenyl succinic anhydride-modified microfibrillated plant fiber (B) or modified plant fiber (b) preferably has a degree of ester substitution (DS) (DS by ASA modification) of about 0.05 to 2.0, more preferably about 0.1 to 2.0, and even more preferably about 0.1 to 0.8, in terms of uniformly dispersing a highly hydrophilic plant fiber in the thermoplastic resin or thermosetting resin (A) and improving water resistance of the plant fiber.

The modified microfibrillated plant fiber or plant fiber that is etherified by methylation, ethylation, etc., or acylated preferably has a degree of ester substitution (DS) (DS by other modification) of about 0.01 to 2.0, about 0.05 to 1.0, and about 0.1 to 0.8, in terms of uniformly dispersing highly hydrophilic plant fiber in the thermoplastic resin or thermosetting resin (A) and improving water resistance of the plant fiber. The type of other modification treatment is not particularly limited, but is a modification to introduce the above functional group.

The total of the degrees of substitution (total DS) obtained by combining DS by ASA modification with DS by other modification is preferably about 0.05 to 2.0, more preferably about 0.1 to 2.0, and even more preferably about 0.1 to 1.0, in view of uniformly dispersing highly hydrophilic plant fiber in the thermoplastic resin or thermosetting resin (A) and improving water resistance of the plant fiber. The type of other modification treatment is not particularly limited, but is a modification to introduce the above functional group.

The DS can be determined by using various analytical methods, such as the rate of weight gain, elemental analysis, neutralization titration, FT-IR, and 1H-NMR, after washing to remove the alkyl or alkenyl succinic anhydride used as a starting material, hydrolysate thereof, and like by-products.

If water remains in the modified microfibrillated plant fiber (B) or modified plant fiber (b) after washing the modified microfibrillated plant fiber (B) or modified plant fiber (b), poor dispersibility in the thermoplastic resin or thermosetting resin will result, which reduces elastic modulus and tensile strength. If the modified microfibrillated plant fiber (B) or modified plant fiber (b) is completely dried, agglomeration occurs between the modified microfibrillated plant fibers (B) or between the modified plant fibers (b), and the modified microfibrillated plant fibers (B) or modified plant fibers (b) are not uniformly dispersed in the step of mixing with the thermoplastic resin or thermosetting resin (A), thus resulting in reduced elastic modulus and tensile strength.

Therefore, it is preferable that after the washing, the solvent is replaced by an organic liquid (C) and the modified microfibrillated plant fiber (B) or modified plant fiber (b) is present in the organic liquid (C).

Examples of the organic liquid (C) include lower alcohols, esters, hydrocarbons, ketones, and ethers. Examples of the lower alcohols include lower alcohols having 1 to 4 carbon atoms, such as methanol, ethanol, n-propanol, isopropyl alcohol, and butanol. Examples of the esters include ethyl acetate, methyl acetate, ethyl propionate, methyl propionate, ethyl butylate, and methyl butyrate. Examples of the hydrocarbons include hydrocarbons having 5 to 10 carbon atoms. Specific examples include pentane, hexane, heptane, octane, nonane, and decane. Specific examples of the ketones include acetone and methyl ethyl ketone. Specific examples of the ethers include diethyl ether, dimethyl ether, tetrahydrofuran (THF), and dioxane. Among these, ethanol, isopropanol, acetone, hexane, dioxane, ethyl acetate, and the like are preferably used. These solvents may be used singly or in a combination of two or more, depending on the purpose.

As compared with undefibrated plant fibers, microfibrillated plant fiber (B') has a very large specific surface area and is very highly cohesive. Therefore, the presence of an organic liquid (C) is essential to mix the modified microfibrillated plant fiber (B) with a thermoplastic resin or thermosetting resin (A) and disperse the fiber in the resin. Because undefibrated plant fibers are less cohesive than microfibrillated plant fibers, it is possible to mix modified plant fiber (b) with a thermoplastic resin or thermosetting resin (A) in the presence of water (C').

The amount of organic liquid (C) used in the step of mixing the modified microfibrillated plant fiber (B) or modified plant fibers (b) with the thermoplastic resin or thermosetting resin (A) in the presence of an organic liquid (C) is preferably about 0.1 to 1,000,000 parts by mass, more preferably about 1 to 100,000 parts by mass, and even more preferably about 10 to 10,000 parts by mass, per 100 parts by mass of the modified microfibrillated plant fiber (B) or modified plant fiber (b). The modified microfibrillated plant fiber (B) or modified plant fiber (b) can be swollen uniformly by setting the amount of organic liquid (C) to 10 parts by mass or more. Production costs can be reduced by setting the amount of organic liquid (C) to 10,000 parts by mass or less.

In the step of mixing the thermoplastic resin or thermosetting resin (A) with the modified microfibrillated plant fiber (B) in the presence of an organic liquid (C), water may be contained in or intentionally mixed with the organic liquid (C) as long as agglomeration of the modified microfibrillated plant fiber (B) does not occur. The acceptable amount of water is less than 20 wt. %, more preferably less than 10 wt. %, of the organic liquid (C).

When the fiber to be mixed with the thermoplastic resin or thermosetting resin (A) is a modified plant fiber (b), water (C') may be contained. Mixing and dispersion can be performed in the presence of water (C').

In the step of mixing the thermoplastic resin or thermosetting resin (A) with the modified microfibrillated plant fiber (B) or modified plant fiber (b) in the presence of an organic liquid (C) (or water (C')), an inorganic salt (D) may also be incorporated. Incorporation of an inorganic salt (D) allows an interaction of the esterified modified microfibrillated plant fiber (B) or modified plant fiber (b) with inorganic particles, thus enhancing the strength, elastic modulus, etc., of the resin composition.

Examples of the inorganic salt (D) include salts of Group I or II metals, such as acetates, carbonates, sulfates, and nitrates of Group I or II metals. Examples of Group I metals include sodium and potassium. Examples of Group II metals include magnesium, calcium, strontium, and barium. Specific examples of the inorganic salt (D) include magnesium sulfate, barium sulfate, barium carbonate, potassium carbonate, and calcium carbonate. The particle size of the inorganic salt can be suitably selected according to the purpose. In general, a smaller particle size is preferable. Among these inorganic salts, carbonates are preferable in view of excellent elastic modulus enhancement effects. Calcium carbonate and barium carbonate are more preferable because a powder having a particle size and/or crystal diameter with a relatively large surface is readily available, interaction with the modified microfibrillated plant fiber (B) or modified plant fiber (b) is easy, and the obtained molded article is less likely to be colored.

The content of the inorganic salt (D) is 0.1 to 20 parts by mass, preferably about 0.5 to 20 parts by mass, more preferably about 1 to 10 parts by mass, and even more preferably about 1 to 10 parts by mass, per 100 parts by mass of the resin composition. When the amount of the inorganic salt (D) is set to 0.1 part by mass or more, dynamic properties of the molded article can be enhanced by interaction with the modified microfibrillated plant fiber (B) or modified plant fiber (b). When the amount of the inorganic salt (D) is set to 20 parts by mass or less, relative amounts of the resin and modified microfibrillated plant fiber (B) or modified plant fiber (b) are not so decreased, thus preventing the reduction of dynamic properties such as strength and elastic modulus, and deterioration of moldability.

In addition to the thermoplastic resin or thermosetting resin (A), modified microfibrillated plant fiber (B) or modified plant fiber (b), and organic liquid (C) (or water (C')), any additive may be optionally incorporated.

Examples of additives that can be incorporated include compatibilizers; surfactants; polysaccharides, such as starch and alginic acid; natural proteins, such as gelatin, hide glue, and casein; inorganic compounds, such as tannin, zeolite, ceramics, and metal powder; antioxidants; colorants; plasticizers; flavors; pigments; flow-regulating agents; leveling agents; conducting agents; antistatic agents; ultraviolet absorbents; ultraviolet dispersants; deodorants; and crystal nucleating agents.

The resin composition of the present invention may further comprise an antioxidant.

Any antioxidant can be used without particular limitation. Examples of preferable antioxidants include phenolic antioxidants, phosphorus-based antioxidants, amine-based antioxidants such as diphenyl amine derivatives, sulfur-based antioxidants, and calcium carbonate-based antioxidants. Such antioxidants can be used singly or in a combination of two or more. The use of an antioxidant can prevent oxidative degradation of the molding material and prevent coloring of a molding material and reduction of strength when a molded article is produced using the molding material.

Examples of the phenolic antioxidants include 2,6-di-t-butyl-4-methylphenol, 1,3,5-tris(3,5-di-t-butyl-4-hydroxybenzyl)isocyanurate, and tetrakis{3-(3,5-di-t-butyl-4-hydroxyphenyl)propionyloxymethyl}methane. Among these, hindered phenol compounds are preferable. For example, Irganox 1010 and Irganox 1045ML produced by BASA Inc., and Sumilizer GA-80 and Sumilizer WX-R produced by Sumitomo Chemical Co., Ltd. are commercially available.

Examples of phosphorus-based antioxidants include alkyl phosphites, alkyl aryl phosphite, alkyl phosphonites, and aryl phosphonites. Specific examples thereof include distearylpentaerythritoldiphosphite, tris(2,4-di-t-butylphenyl)phosphite, tetrakis(2,4-di-t-butylphenyl)-4,4'-biphenylenephosphite, bis(2,4-di-tert-butylphenyl)pentaerythritol-diphosphite, bis(2,4-di-t-butyl-4-methylphenyl)pentaerythritol-diphosphite, and 1,1,3-tris(2-methyl-4-ditridecylphosphite-5-t-butylphenyl)butane. Irgafos 168 produced by Ciba Specialty Chemicals Co., Ltd. and ADK STAB PEP-36 and ADK STAB PEP-24G produced by Adeka Corporation are commercially available.

Examples of the sulfur-based antioxidants include dilauryl 3,3'-thiodipropionate, dimyristoyl 3,3'-thiodipropionate, and distearyl 3,3'-thiodipropionate. For example, one commercially available, such as Sumilizer TPL-R (produced by Sumitomo Chemical Co., Ltd.), can be used.

As long as the effect of the present invention is not impaired, optional additive content may be any suitable amount. For example, the amount of optional additive in the resin composition is preferably about 0.01 to 10 mass %, and more preferably about 0.01 to 5 mass %.

The amount of antioxidant contained in the resin composition can be suitably adjusted from the viewpoint of preventing oxidative degradation of the molding material and preventing coloring of the molded article and reduction of strength when a molded article is produced using the molding material. For example, the amount of antioxidant in the resin composition is preferably about 0.001 to 10 mass %, and more preferably about 0.01 to 5 mass %.

If the molding conditions under which a molded article is produced using the molding material are such that oxidative degradation of the molding material can be prevented and coloring of the molded article and reduction of strength can be prevented, it is not necessary to use antioxidants.

Addition of an antioxidant during kneading in step (2) is preferable from the viewpoint of more effectively preventing oxidative degradation of the molding material and more effectively preventing coloring of the molding material and reduction of strength when a molded article is produced using the molding material.

The method for mixing the thermoplastic resin or thermosetting resin (A), modified microfibrillated plant fiber (B) or modified plant fiber (b), and other optional additives in the presence of an organic liquid (C) (or water (C')) is not particularly limited, and includes, for example, methods using a device capable of mixing or stirring, such as a mixer, a blender, a twin-screw extruder, a kneader, Laboplastomill, a homogenizer, a high speed homogenizer, a high pressure homogenizer, a planetary mixer, or a three-roll mill. The mixing may be performed with heating and/or under reduced pressure to remove the organic liquid (C) (or water (C')) to some extent. Mixing the above components in the presence of an organic liquid (C) (or water (C')) can inhibit agglomeration of the modified microfibrillated plant fiber (B) or modified plant fiber (b) in the thermoplastic resin or thermosetting resin (A) when drying, thus obtaining a uniform dispersion.

After mixing, the obtained mixture may contain the organic liquid (C) (or water (C')), or may be a powder or pellet that is substantially free from the organic liquid (C) (or water (C')).

After mixing in step (1), the obtained mixture is kneaded in step (2). Examples of the method for kneading the mixture include kneading (melt kneading) methods using devices capable of heating and stirring, such as twin-screw kneaders, kneaders, and solid-phase shear extruders. The mixture may be pulverized using a known pulverizer, and then mixed.

Step (2) is preferably a step of further kneading the mixture obtained in step (1) in the presence of an antioxidant. The amount of antioxidant to be incorporated is as described above.

The organic liquid (C) (or water (C')) may be removed during kneading in step (2), but is preferably removed during step (1) until the content of the organic liquid (C) (or water (C')) is 10 mass % or less, based on the total amount of the mixture of the fiber and resin subjected to step (2).

The kneading temperature in the above kneading can be suitably selected according to the type of thermoplastic resin or thermosetting resin (A) used. For example, the temperature is preferably 0 to 300° C., and more preferably 50 to 250° C. When a high-density polyethylene is used, the temperature is preferably 160 to 200° C. When polypropylene is used, the temperature is preferably about 160 to 220° C., and more preferably about 170 to 210° C. When a polylactic acid is used, the temperature is preferably 160 to 220° C., and more preferably 170 to 210° C.

When modified plant fiber (b) is used in step (1), agglomeration of the modified plant fiber (b) in the thermoplastic resin or thermosetting resin (A) can be inhibited by mixing the modified plant fiber (b) with the thermoplastic resin or thermosetting resin (A) in the presence of an organic liquid (C) (or water (C')) in step (1), thereby obtaining a uniformly dispersed mixture. When the mixture is kneaded in step (2), the modified plant fiber (b) is defibrated in the thermoplastic resin or thermosetting resin (A) during kneading, and a resin composition in which the modified microfibrillated plant fiber (B) is dispersed in the thermoplastic resin or thermosetting resin (A) can be produced.

Specific examples of the method comprising mixing the thermoplastic resin or thermosetting resin (A), modified microfibrillated plant fiber (B) or modified plant fiber (b), and organic liquid (C) (or water (C')), and kneading the obtained mixture include production methods (I) to (III) shown in FIGS. 1 to 3.

Production Method (I)

FIG. 1 is a diagram describing in detail a production method comprising step (1) of mixing a thermoplastic resin or thermosetting resin (A) with modified plant fiber (b) in the presence of an organic liquid (C), the modified plant fiber (b) being obtained by modifying plant fiber (b') with an alkyl or alkenyl succinic anhydride in a liquid capable of swelling the plant fiber (b').

Production method (I) shown in FIG. 1 comprises the step of swelling the plant fiber (b') in a liquid capable of swelling the plant fiber (b'), and esterifying the swollen plant fiber (b') with an alkyl or alkenyl succinic anhydride (hereinafter sometimes referred to as "ASA") to prepare ASA-modified plant fiber (b); the step of adding an organic liquid (C) or water (C') to the obtained ASA-modified plant fiber to form an organic liquid-containing ASA-modified plant fiber; the step of mixing the obtained organic liquid-containing ASA-modified plant fiber with a thermoplastic resin or thermosetting resin (A); and the step of kneading the mixture to defibrate the modified plant fiber (b) in the thermoplastic resin or thermosetting resin (A).

Examples of the method of esterifying the plant fiber (b') with ASA include those mentioned above. Carboxylic acid groups that are present in the ASA-modified plant fiber (b) may be further modified. Examples of the method of modifying carboxylic acid groups include those mentioned above.

Production Method (II)

FIG. 2 is a diagram describing in detail a production method comprising step (1) of mixing the thermoplastic resin or thermosetting resin (A) of the present invention with modified microfibrillated plant fiber (B) in the presence of an organic liquid (C), the modified microfibrillated plant fiber (B) being obtained by modifying plant fiber (b') with an alkyl or alkenyl succinic anhydride in a liquid capable of swelling the plant fiber (b') and then defibrating the modified plant fiber (b).

Production method (II) shown in FIG. 2 comprises the step of swelling plant fiber (b') in a liquid capable of swelling the plant fiber (b'), esterifying the swollen plant fiber (b') with ASA, and defibrating the obtained ASA-modified plant fiber (b); the step of adding an organic liquid (C) to the obtained ASA-modified microfibrillated plant fiber (B) to prepare an organic liquid-containing ASA-modified microfibrillated plant fiber; the step of mixing the obtained organic liquid-containing ASA-modified microfibrillated plant fiber with a thermoplastic resin or thermosetting resin (A); and the step of optionally kneading the obtained mixture.

Examples of the method of esterifying the plant fiber (b') with ASA include those mentioned above. Carboxylic acid groups that are present in the ASA-modified microfibrillated plant fiber (B) may be further modified. Examples of the method of modifying carboxylic acid groups include those mentioned above.

Production Method (III)

FIG. 3 is a diagram describing in detail a production method comprising step (1) of mixing a thermoplastic resin or thermosetting resin (A) with modified microfibrillated plant fiber (B) in the presence of an organic liquid (C), the modified microfibrillated plant fiber (B) being obtained by modifying microfibrillated plant fiber (B') with an alkyl or alkenyl succinic anhydride in a liquid capable of swelling the microfibrillated plant fiber (B').

Production method (III) shown in FIG. 3 comprises the step of swelling microfibrillated plant fiber (B') in a liquid capable of swelling the microfibrillated plant fiber (B'), esterifying the swollen microfibrillated plant fiber (B') with ASA, and adding an organic liquid (C) to the obtained ASA-modified microfibrillated plant fiber (B) to prepare an organic liquid-containing ASA-modified microfibrillated plant fiber; the step of mixing the obtained organic liquid-containing ASA-modified microfibrillated plant fiber with a thermoplastic resin or thermosetting resin (A); and the step of optionally kneading the obtained mixture.

Examples of the method of preparing microfibrillated plant fiber and the method of esterifying microfibrillated plant fiber (B') with ASA include those mentioned above. Carboxylic acid groups that are present in the ASA-modified microfibrillated plant fiber (B) may be further modified. Examples of the method of modifying carboxylic acid groups include those mentioned above.

Among these production methods, production method (I) shown in FIG. 1 is a process in which during the kneading, modified plant fiber (b) is defibrated in a thermoplastic resin or thermosetting resin (A) and ASA-modified microfibrillated plant fiber (B) is dispersed in the thermoplastic resin or thermosetting resin (A). Accordingly, production method (I) is preferable because there is no need to additionally include a step of defibrating the modified microfibrillated plant fiber (b') and productivity can be enhanced.

The resin composition of the present invention comprises a thermoplastic resin and modified microfibrillated plant fiber (B), and preferably has a structure in which the thermoplastic resin in the resin composition is in the form of lamellae that are layered in a direction different from the fiber length direction of the modified microfibrillated plant fiber (B).

Preferably, the resin composition of the present invention comprises resin fibrous cores of the thermoplastic resin that are uniaxially oriented in the fiber length direction of the modified microfibrillated plant fiber (B), and has a structure in which the lamellae of the thermoplastic resin are layered between the modified microfibrillated plant fiber (B) and the fibrous cores in a direction different from the fiber length direction of the modified microfibrillated plant fiber (B).

The resin composition preferably comprises modified microfibrillated plant fiber (B) obtained by modifying microfibrillated plant fiber (B') with an alkyl or alkenyl succinic anhydride.

The modified microfibrillated plant fiber (B) is preferably obtained by subjecting microfibrillated plant fiber (B') to modification with an alkyl or alkenyl succinic anhydride, and to modification by at least one type of acylation.

The resin composition of the present invention comprises a thermoplastic resin and modified microfibrillated plant fiber (B) and/or modified plant fiber (b), and the modified microfibrillated plant fiber (B) and/or modified plant fiber (b) is obtained by subjecting microfibrillated plant fiber (B') and/or plant fiber (b') to modification with an alkyl or alkenyl succinic anhydride and to modification by at least one type of acylation.

The modified microfibrillated plant fibers (B), modified plant fibers (b), microfibrillated plant fiber (B'), and plant fibers (b') are as described above. The modification with an alkyl or alkenyl succinic anhydride and modification by at least one type of acylation are as described above.

Examples of the thermoplastic resin include those mentioned above. Polyolefin resins, polyamide resins, polyester resins, and polyacetal resins are preferable. Examples of polyolefin resins include polyethylene and polypropylene.

The modified microfibrillated plant fibers (B) in the resin composition typically has an average fiber diameter of about 4 to 800 nm, preferably about 20 to 500 nm, and particularly preferably about 10 to 400 nm.

The average fiber diameter of the modified microfibrillated plant fiber of the present invention is obtained by measuring the fiber diameter of at least 50 modified microfibrillated plant fibers within an electron microscope field of view and calculating the average.

The resin composition of the present invention or the resin composition obtained by using one of the above production methods can be formed (molded) into a desired shape and used as a resin molding material. The resin molding material may be in the form of, for example, a sheet, pellet, powder, or the like. The molding material having the above shape may be obtained, for example, by metal molding, injection molding, extrusion molding, blow molding, or foam molding.

Further, the molding material can be molded into a resin molded article under suitable molding conditions. The molded article can be used not only in fields in which resin molded products comprising microfibrillated plant fiber have been used, but also in fields that require higher mechanical strength (tensile strength, etc.). For example, the molded article can be effectively applied to interior materials, exterior materials, and structural materials of transportation vehicles such as automobiles, trains, ships, and airplanes; the housings, structural materials, and internal parts of electrical appliances such as personal computers, televisions, telephones, and watches; the housings, structural materials, and internal parts of mobile communication devices such as mobile phones; the housings, structural materials, and internal parts of devices such as portable music players, video players, printers, copiers, and sporting equipment; building materials; office supplies such as writing supplies; tanks; containers, and the like.

Advantageous Effects of Invention

According to the method of producing the resin composition of the present invention, microfibrillated plant fiber can be uniformly dispersed in a highly hydrophobic resin by simple steps. Therefore, the molding material obtained by molding the resin composition has high strength and thus advantageously has excellent mechanical strength.

The resin composition of the present invention has a regular structure in that the thermoplastic resin in the resin composition is in the form of lamelle that are layered in a direction different from the fiber length direction of the modified microfibrillated plant fiber (B). Therefore, the molded article formed using the resin composition advantageously has excellent mechanical strength.

DESCRIPTION OF EMBODIMENTS

EXAMPLES

Figure 1:
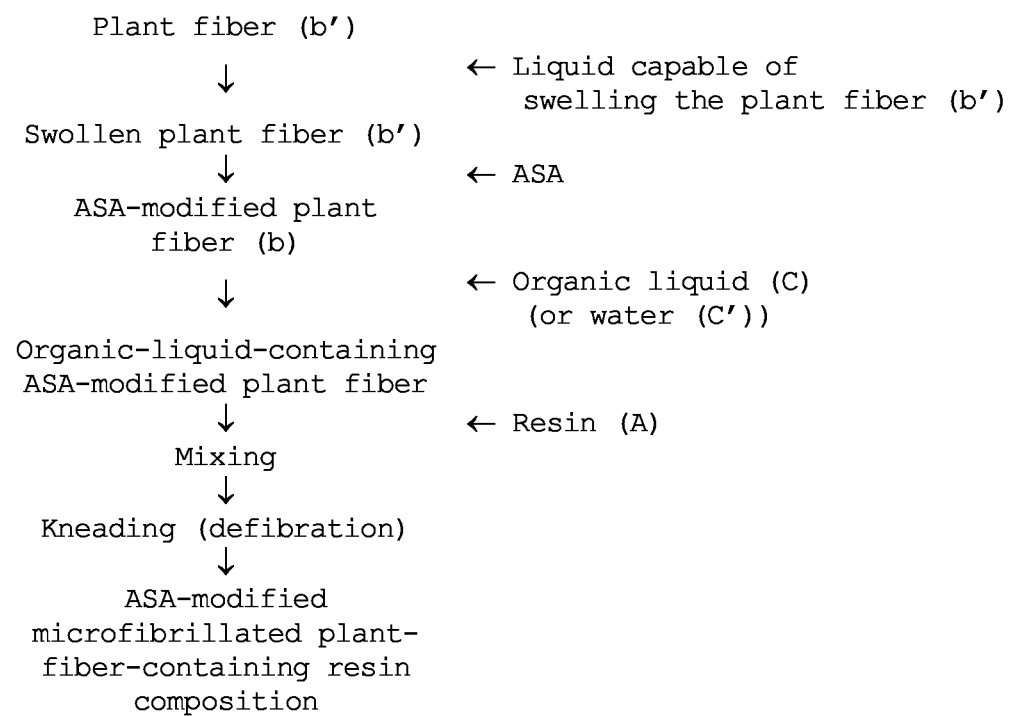
FIG. 1 shows a scheme according to one embodiment of the production method of the present invention.
Figure 2:
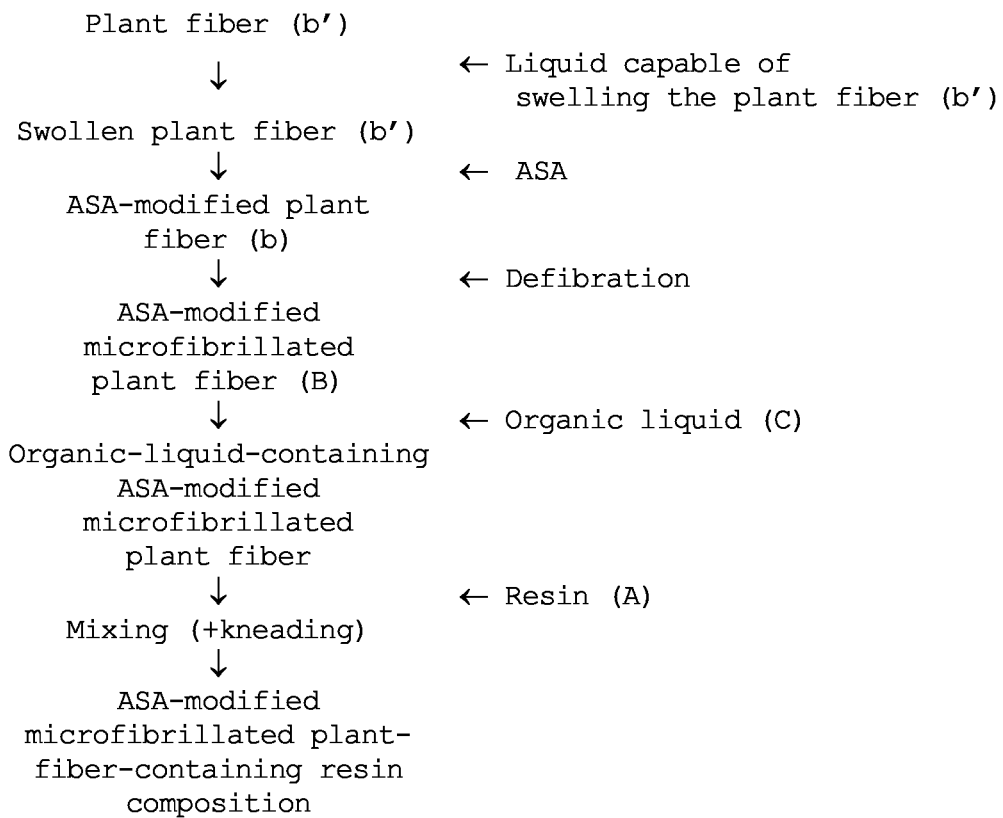
FIG. 2 shows a scheme according to another embodiment of the production method of the present invention.
Figure 3:
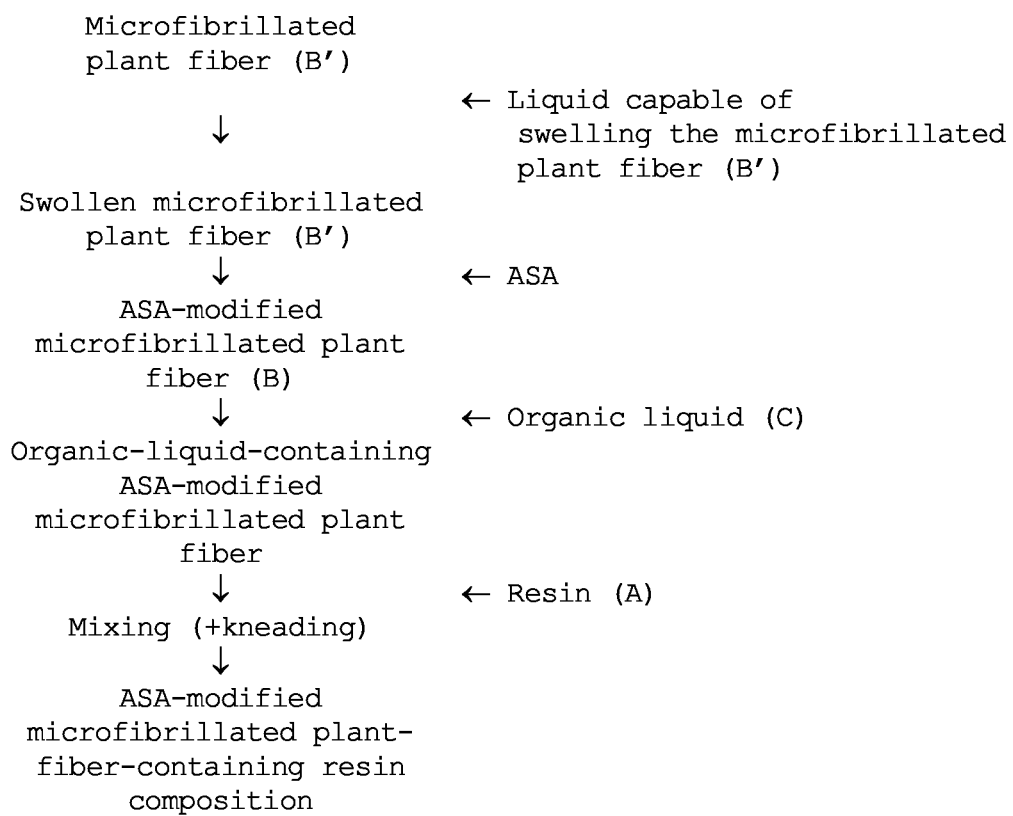
FIG. 3 shows a scheme according to another embodiment of the production method of the present invention.

The present invention is described below in further detail with reference to Examples and Comparative Examples. The present invention, however, is not limited to these.

Example 1

Preparation of Refiner-Treated Plant Fiber

A slurry of needle bleached kraft pulp (NBKP)(slurry concentration: 2% by mass) was passed through a single-disk refiner (produced by Kumagai Riki Kogyo Co., Ltd.) and repeatedly subjected to refiner treatment until the Canadian standard freeness (CSF) value of 100 mL or less was achieved. The obtained slurry was concentrated using a centrifuge (produced by Kokusan Co., Ltd.) to a pulp concentration of 20% by mass, thus preparing (refiner-treated) NBKP.

Preparation of Alkenyl Succinic Anhydride (ASA)-Modified Plant Fiber 8,000 g of N-methylpyrrolidone (NMP) was added to 10,000 g (solids content: 2,000 g) of the (refiner-treated) hydrous NBKP. After the mixture was placed in a triple-blade stirring mixer (Trimix TX-50, produced by Inoue Manufacturing Inc.), stirring was started and the mixture was dehydrated under reduced pressure at 40 to 50° C. Subsequently, 1,998 g of T-NS135 (ASA having 16 carbon atoms, except for the number of carbon atoms of succinic anhydride, produced by Seiko PMC Corporation), and 170 g of potassium carbonate were added, and a reaction was allowed to proceed at 65° C. for 1.5 hours. After the reaction, the reaction mixture was washed successively with acetone, ethanol, aqueous acetic acid, and water, and the solvent was replaced with ethanol to obtain an ethanol (EtOH)-containing ASA-modified plant fiber (ASA-modified NBKP). The obtained ASA-modified plant fiber had a degree of substitution of 0.37, as calculated by using the following methods. Further, the ethanol-containing ASA-modified NBKP had a water content of 1.4% and an ethanol content of 73.6%, as calculated by using the following methods.

Calculation of the Degree of Substitution (DS) of the ASA-Modified Plant Fiber

The ester bond between cellulose and ASA in the ASA-modified plant fiber was hydrolyzed by heating at 70° C. with stirring in a sodium hydroxide solution. Then, the amount of ASA produced by hydrolysis was determined by back titration with 0.1N aqueous hydrochloric acid solution against phenolphthalein as an indicator, thus calculating the degree of substitution (DS) by ASA modification.

Specifically, about 0.5 g of the dehydrated product of the ASA-modified plant fiber was weighed precisely into a 100-ml beaker, and 15 ml of ethanol and 5 ml of distilled water were added. The mixture was stirred at room temperature for 30 minutes. Then, 10 ml of 0.5N sodium hydroxide solution was added and stirred at 70° C. for 15 minutes. The resulting mixture was cooled to room temperature and further stirred overnight. Several drops of an ethanol solution of 85% phenolphthalein were added to the obtained mixture, followed by back titration with 0.1N aqueous hydrochloric acid to determine the amount of ASA produced by hydrolysis. The degree of substitution was calculated from the amount of the ASA-modified plant fiber used and the amount of ASA determined by titration.

Calculation of the Water Content and Organic Liquid Content

The water content of the organic liquid-containing ASA-modified plant fiber (ASA-modified NBKP) was determined with a Karl Fischer moisture meter (MKC-610, produced by Kyoto Electronics Manufacturing Co., Ltd.).

Further, the amount of volatile matter in the organic liquid-containing ASA-modified plant fiber was measured with an infrared moisture meter (FD-720, produced by Kett Electric Laboratory).

The organic liquid content was calculated from the amount of volatile matter and water content according to the following formula.

Organic liquid content (%)=(The amount of volatile matter (%) measured with the infrared moisture meter)−(water content (%) measured with the Karl Fischer moisture meter)

Formation of Composite of the ASA-Modified Plant Fiber and Resin

Ethanol was added to the ethanol-containing ASA-modified plant fiber (ASA-modified NBKP, ethanol content: 73.6 mass %, water content: 1.4 mass %) to adjust the solids concentration to 3.0 mass %. The ASA-modified plant fiber dispersed in ethanol (solids content 52.1 g) was mixed in a beaker under propeller agitation with a dispersion prepared by adding ethanol to each of 12.9 g of maleic anhydride-modified polypropylene (MAPP, Toyotac PMA H1000P, produced by Toyobo Co., Ltd., acid content: 5.7 mass %, melt flow rate: 110 g/10 min (190° C., 2.16 kg)), 4 g of calcium carbonate ($CaCO_3$, Brilliant-15, produced by Shiraishi Kogyo Kaisha, Ltd.), and 31.0 g of high-density polyethylene (HDPE, trade name Flo-beads HE3040, produced by Sumitomo Seika Chemicals Co., Ltd., melting point: 130° C.) to adjust the solids concentration to 10.0 mass %. The obtained resin mixture dispersion was suction-filtered and dried under reduced pressure while stirring using a Trimix. A mixture (a master batch) of the ASA-modified NBKP and resin was thereby obtained.

Based on solids, the proportions of components in the mixture are as follows.

ASA-modified NBKP: 52.1 mass % (NBKP-derived portion (30 mass %)+ASA-derived portion (22.1 mass %));

resin: 43.9 mass % (MAPP: (12.9 mass %)+HDPE (31 mass %)); and calcium carbonate: 4 wt. %.

The water content and ethanol content of the obtained master batch were determined by using the above measurement methods. The water content was 0.5%, and the ethanol content was 2.0%.

Subsequently, a mixture of 100 g of the obtained master batch and 200 g of HDPE (SUNTEC-HD J320, produced by Asahi Kasei Chemicals Corporation) was passed once through a twin-screw extruder (KZW, produced by Technovel Corporation, screw diameter: 15 mm, L/D: 45, screw rotation: 200 rpm, number of blocking structures: zero, processing speed: 200 g/hr) at 140° C. The obtained melt-kneaded product was pelletized using a pelletizer (produced by Technovel Corporation), and then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 160° C. and a mold temperature of 40° C.

Based on solids, the proportions of components in the final resin composition are as follows.

ASA-modified NBKP: 17.4 mass % (NBKP-derived portion (10 mass %)+ASA-derived portion (7.4 mass %));

resin: 81.3 mass % (MAPP: (4.3 mass %)+HDPE (77.0 mass %)); and calcium carbonate: 1.3 wt. %.

The tensile strength and elastic modulus of the obtained dumbbell test piece were determined using a universal testing machine (Instron 3365 tester, produced by Instron Co. Ltd.). Table 1 shows the measurement results.

Figure 4:
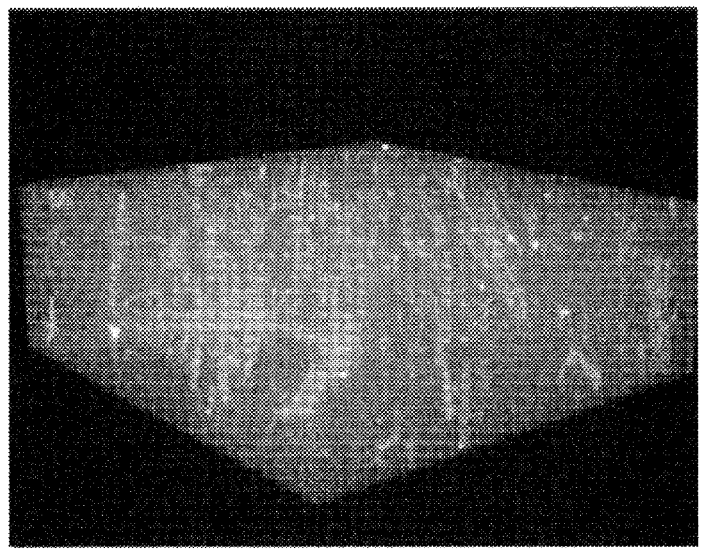
FIG. 4 shows an X-ray CT scanner image of the molded article obtained in Example 1.

Further, the obtained molded article was observed using an X-ray CT scanner (SkyScan 1172, produced by Skyscan). FIG. 4 shows an X-ray CT scanner image.

Example 2

In the preparation of ASA-modified plant fiber in Example 1, after the reaction of NBKP with ASA, the reaction mixture was washed successively with acetone, ethanol, acetic acid water, and water to obtain a hydrous ASA-modified NBKP. The obtained ASA-modified NBKP had a degree of substitution of 0.34.

The hydrous ASA-modified NBKP (solids concentration: 20 mass %), MAPP (trade name Toyotac PMA H1000P, produced by Toyobo Co., Ltd.), and a high-density polyethylene resin (HDPE, trade name Flo-Beads HE3040, produced by Sumitomo Seika Chemicals Co., Ltd.) were stirred using a mixer for 1 minute.

Based on solids, the proportions of components in the mixture are as follows.

ASA-modified microfibrillated plant fiber: 50.3 mass % (microfibrillated plant fiber-derived portion (30 mass %)+ASA-derived portion (20.3 mass %));

resin: 45.7 mass % (MAPP: (12.9 mass %)+HDPE (32.8 mass %)); and calcium carbonate: 4 wt. %.

The obtained resin composition was dried under reduced pressure using a Trimix TX-5 (produced by Inoue Manufacturing Inc.). Subsequently, the mixture was passed once through a twin-screw extruder at 140° C. The obtained melt-kneaded product was pelletized using a pelletizer (produced by Technovel Corporation) and then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 160° C. and a mold temperature of 40° C.

The elastic modulus and tensile strength of the obtained dumbbell test piece were measured by using the same methods as in Example 1. Table 1 shows the measurement results.

Comparative Example 1

A dumbbell test piece was produced by molding in the same manner as in Example 1 except that HDPE powder (Flo-Beads HE3040, produced by Sumitomo Seika Chemicals Co., Ltd.) was used alone without using ASA-modified NBKP in Example 1.

The elastic modulus and tensile strength of the obtained dumbbell test piece were measured in the same manner as in Example 1. Table 1 shows the measurement results. The heat deflection temperature (HDT) and average linear expansion coefficient were measured by using the methods described below. Tables 3 and 5 show the results.

Comparative Example 2

A dumbbell test piece was produced by molding in the same manner as in Example 1 except that only the HDPE pellet (trade name SUNTEC-HD J320, produced by Asahi Kasei Chemicals Corporation) was used without using the ASA-modified NBKP in Example 1.

The elastic modulus and tensile strength of the obtained dumbbell test piece were measured in the same manner as in Example 1. Table 1 shows the measurement results. The heat distortion temperature (HDT), average linear expansion coefficient, and thermal conductivity were measured by using the methods described below. Tables 3 to 5 show the results.

Figure 10:
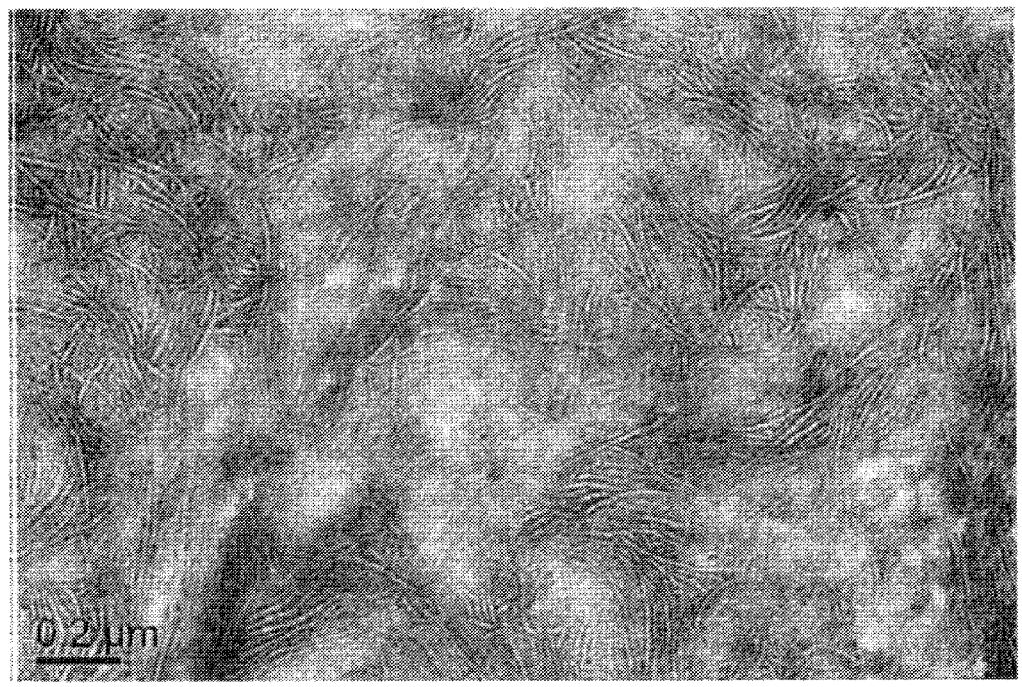
FIG. 10 shows a TEM photograph of the molded article obtained in Comparative Example 2.

Further, the obtained molded article was observed under a transmission microscope (TEM). FIG. 10 shows a TEM photograph.

Comparative Example 3

A dumbbell test piece was produced by forming a composite and molding in the same manner as in Example 1 except that an unmodified ethanol-containing NBKP was used.

Figure 5:
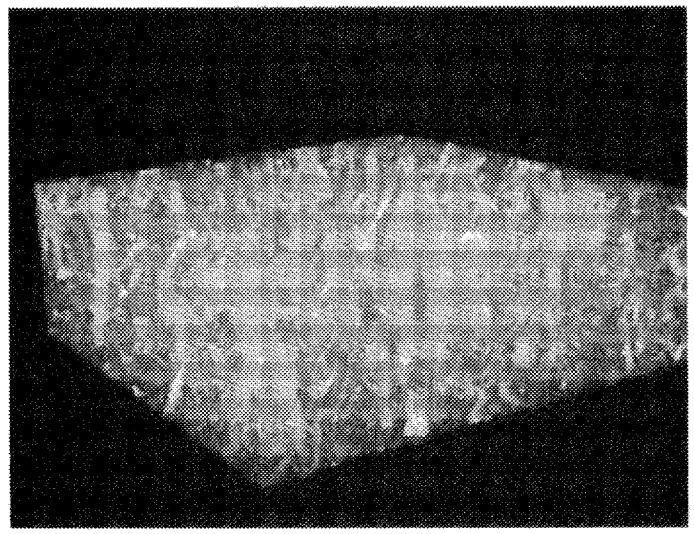
FIG. 5 shows an X-ray CT scanner image of the molded article obtained in Comparative Example 3.

The obtained molded article was observed in the same manner as in Example 1 by using an X-ray CT scanner. FIG. 5 shows an X-ray CT scanner image.

The elastic modulus and tensile strength of the obtained dumbbell test piece were measured in the same manner as in Example 1. Table 1 shows the measurement results.

In contrast, the X-ray CT image in FIG. 5 shows many fibers with a width of 2 to 10 μm. The results indicate that when unmodified NBKP and resin are kneaded as in Comparative Example 3, NBKP is not sufficiently defibrated and many undefibrated fibers with a width of several micrometers are present.

It is presumed that when ASA-modified NBKP is used, the ASA-modified NBKP is defibrated to a nano level by shear stress during kneading due to high interfacial adhesion between the ASA-modified NBKP and the resin, thus obtaining a composite material of the ASA-modified microfibrillated plant fiber and resin. Whereas when unmodified NBKP is used, due to poor compatibility of the NBKP and resin, a fully microfibrillated composite material cannot be obtained.

Further, Table 1 shows that both the elastic modulus and tensile strength were enhanced in Example 1, in which ASA-modified plant fiber (ASA-modified NBKP) and HDPE were mixed in the presence of an organic liquid, and in Example 2, in which hydrous ASA-modified plant fiber was mixed with HDPE, compared to the case in which only the resin was used, or Comparative Example 3, in which unmodified plant fiber was used. It is thought that kneading after mixing the ASA-modified NBKP and resin in an organic liquid (C) as in Example 1 promotes defibration further to a nano level, compared to Comparative Example 3, which used unmodified pulp, or Example 2, which used hydrous ASA-modified pulp, thus providing a composite material with excellent mechanical properties.

It is also thought that because plant fibers (NBKP) are not as cohesive as microfibrillated plant fibers, even hydrous ASA-modified plant fiber as in Example 2 can be dispersed well by shear force during melt kneading, thus providing good physical properties.

Example 3

Preparation of Microfibrillated Plant Fiber

A slurry of needle bleached kraft pulp (NBKP) (slurry concentration: 2 mass %) was passed through a single-disk

TABLE 1

| | ASA-modified plant fiber | | | Resin molded article | | |
| --- | --- | --- | --- | --- | --- | --- |
| Example | DS | Solvent contained | Modification of carboxyl group | Proportion of ASA-modified microfibrillated plant fiber (mass %) | Elastic modulus (GPa) | Tensile strength (MPa) |
| Example 1 | 0.4 | EtOH | H | 18 | 3.13 | 54.1 |
| Example 2 | 0.34 | Water | H | 16.8 | 2.52 | 50.3 |
| Comparative Example 1 | — | — | — | — | 1.06 | 21.6 |
| Example 2 | — | — | — | — | 0.82 | 23.4 |
| Example 3 | 0 | EtOH | — | 10 | 1.64 | 37.8 |

Results and Discussion

The results of the X-ray CT scanner in FIG. 4 show the following. When the resin and ASA-modified plant fiber (ASA-modified NBKP) were mixed by using the method in Example 1, no NBKP fiber having a width of 10 μm, which is the width before kneading with the resin, was observed. Although a slight amount of fibers having a width of several micrometers were observed, almost no fibers were detected, which indicates that most of the fibers were defibrated to below detection levels (<700 nm).

refiner (produced by Kumagai Riki Kogyo Co., Ltd.) and repeatedly subjected to refiner treatment until a Canadian standard freeness (CSF) value of 100 mL or less was achieved. The obtained slurry was concentrated using a centrifuge (produced by Kokusan Co., Ltd.) to a concentration of 20 mass %, thus preparing (refiner-treated) NBKP.

Subsequently, water was added to 375 g of the (refiner-treated) NBKP (concentration: 20 mass %) to make a total amount of 10 kg (slurry concentration: 0.75 mass %). The obtained refiner-treated NBKP slurry was subjected to mechanical defibration treatment using a bead mill (NVM-2, produced by Aimex Co., Ltd.) under the following conditions.
Defibration Conditions
Beads: zirconia beads (diameter: 1 mm)
Vessel capacity: 2 liters
Amount of beads filled: 1,216 ml (4,612 g)
Rotating speed: 2,000 rpm
Vessel temperature: 20° C.
Discharge rate: 600 ml/min.

The obtained microfibrillated plant fiber slurry was suction-filtered to obtain a hydrous microfibrillated plant fiber with a solids concentration of 12.5 mass %.
Preparation of ASA-Modified Microfibrillated Plant Fiber 247 g of NMP was added to 494 g (solids content: 62 g) of the above hydrous microfibrillated plant fiber. After the mixture was placed in a Trimix TX-5 (produced by Inoue Manufacturing Inc.), stirring was started and the mixture was dehydrated under reduced pressure at 40 to 50° C. Subsequently, 61.6 g of T-NS135 (ASA having 16 carbon atoms, except for the number of carbon atoms of succinic anhydride, produced by Seiko PMC Corporation), 21.1 g of potassium carbonate, and 50 g of NMP were added, and a reaction was allowed to proceed at 62° C. for 1.5 hours.

After the reaction, the reaction mixture was washed successively with acetone, ethanol, aqueous acetic acid, and water, and the solvent was replaced with ethanol to obtain an ethanol-containing ASA-modified plant fiber. The obtained ASA-modified plant fiber had a degree of substitution of 0.39, as determined by using the same method as in Example 1.

Ethanol was added to the obtained ethanol-containing ASA-modified microfibrillated plant fiber to adjust the solids concentration to 3.0 mass %. The ASA-modified microfibrillated plant fiber (solids content 53.3 g) dispersed in ethanol was mixed in a beaker under propeller agitation with a dispersion prepared by adding ethanol to each of 12.9 g of MAPP (produced by Toyobo Co., Ltd., trade name Toyotac PMA H1000P), 4 g of CaCO₃ (trade name Brilliant-15, produced by Shiraishi Kogyo Kaisha, Ltd.), and 29.8 g of high-density polyethylene (HDPE) (trade name Flo-beads HE3040, produced by Sumitomo Seika Chemicals Co., Ltd.) to adjust the solids concentration to 10.0 mass %. The obtained resin mixture dispersion was suction-filtered and dried under reduced pressure while stirring using a Trimix. A mixture (a master batch) of the ASA-modified microfibrillated plant fiber and resin was thereby obtained.

Based on solids, the proportions of components in the mixture are as follows:

ASA-modified microfibrillated plant fiber: 53.3 mass % (microfibrillated plant fiber-derived portion (30 mass %))+ASA-derived portion (23.3 mass %));

resin: 42.7 mass % (MAPP: (12.9 mass %)+HDPE (29.8 mass %)); and calcium carbonate: 4 wt. %.

Subsequently, a mixture of 100 g of the obtained master batch and 200 g of HDPE (produced by Asahi Kasei Chemicals Corporation, trade name SUNTEC-HD J320) was passed once through a twin-screw extruder produced by Technovel Corporation (KZW, screw diameter: 15 mm, L/D: 45, screw rotation: 200 rpm, number of blocking structures: zero, processing speed: 200 g/hr) at 140° C., and the obtained melt-kneaded product was pelletized using a pelletizer (produced by Technovel Corporation), and then placed into an injection molder (NPX7-1F, produced by Nissei Plastic Industrial Co., Ltd.) to obtain a dumbbell test piece (thickness: 1 mm). The molding was performed at a heating tower (cylinder) temperature of 160° C. and a mold temperature of 40° C.

Based on solids, the proportions of components in the final resin composition, based on solids are as follows:

ASA-modified microfibrillated plant fiber: 17.8 mass % (microfibrillated plant fiber-derived portion (10 mass %)+ASA-derived portion (7.8 mass %));

resin: 80.9 mass % (MAPP:(4.3 mass %)+HDPE (76.3 mass %)); and calcium carbonate: 1.3 wt. %.

The tensile strength and elastic modulus of the obtained dumbbell test piece having a thickness of 1 mm were measured in the same manner as in Example 1. Table 2 below shows the measurement results. Further, the average linear expansion coefficient, thermal conductivity, and heat distortion temperature (HDT) were measured by using the methods described below. Tables 3 to 5 show the results.

Figure 6:
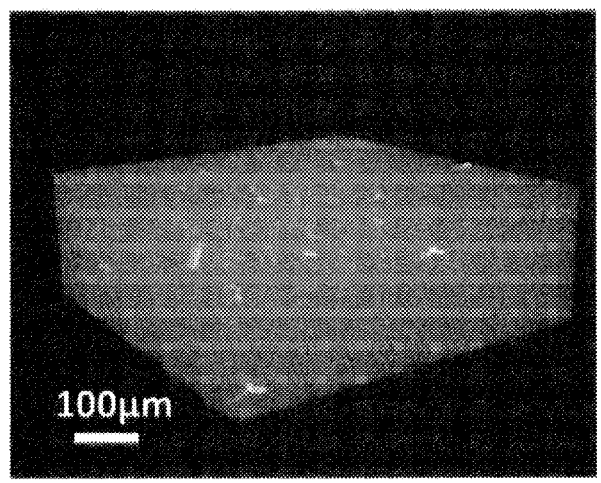
FIG. 6 shows an X-ray CT scanner image of the molded article obtained in Example 3.

The obtained molded article was observed using an X-ray CT scanner in the same manner as in Example 1. FIG. 6 shows an X-ray CT scanner image.

Figure 7:
FIG. 7 is a TEM photograph of the molded article obtained in Example 3.

Further, the obtained molded article was observed under a transmission microscope (TEM). FIG. 7 shows a TEM image.

Example 4

In the preparation of ASA-modified microfibrillated plant fiber in Example 3, after the reaction of microfibrillated plant fiber with ASA, the reaction mixture was washed successively with acetone, ethanol, aqueous acetic acid, and water, and the solvent was replaced with isopropanol (IPA) to obtain an IPA-containing ASA-modified plant fiber.

A dumbbell test piece was produced by forming a composite with resin and molding in the same manner as in Example 3 except that the obtained IPA-containing ASA-modified plant fiber was used.

The elastic modulus and tensile strength of the obtained dumbbell test piece were measured in the same manner as in Example 1. Table 2 shows the measurement results.

Example 5

In the preparation of ASA-modified microfibrillated plant fiber in Example 3, after the reaction of microfibrillated plant fiber with ASA, the reaction mixture was washed successively with acetone, ethanol, aqueous acetic acid, and water, and the solvent was replaced with acetone to obtain an acetone-containing ASA-modified plant fiber.

A dumbbell test piece was produced by forming a composite with resin and molding in the same manner as in Example 3 except that the obtained acetone-containing ASA-modified plant fiber was used.

The elastic modulus and tensile strength of the obtained dumbbell test piece were measured in the same manner as in Example 1. Table 2 shows the measurement results.

Example 6

In the preparation of ASA-modified microfibrillated plant fiber in Example 3, after the reaction of microfibrillated plant fiber with ASA, the reaction mixture was washed successively with acetone, ethanol, aqueous acetic acid, and water, and the solvent was replaced successively with acetone and dioxane to obtain a dioxane-containing ASA-modified microfibrillated plant fiber.

A dumbbell test piece was produced by forming a composite with resin and molding in the same manner as in Example 3 except that the obtained dioxane-containing ASA-modified plant fiber was used.

The elastic modulus and tensile strength of the obtained dumbbell test piece were measured in the same manner as in Example 1. Table 2 shows the measurement results.

Example 7

In the preparation of ASA-modified microfibrillated plant fiber in Example 3, after the reaction of microfibrillated plant fiber with ASA, the reaction mixture was washed successively with acetone, ethanol, aqueous acetic acid, and water, and the solvent was replaced successively with acetone and ethyl acetate to obtain an ethyl acetate-containing ASA-modified microfibrillated plant fiber.

A dumbbell test piece was produced by forming a composite with resin and molding in the same manner as in Example 3 except that the obtained ethyl acetate-containing ASA-modified plant fiber was used.

The elastic modulus and tensile strength of the obtained dumbbell test piece were measured in the same manner as in Example 1. Table 2 shows the measurement results.

Example 8

In the preparation of ASA-modified microfibrillated plant fiber in Example 3, after the reaction of the microfibrillated plant fiber with ASA, the reaction mixture was washed successively with acetone, ethanol, aqueous acetic acid, and water, and the solvent was replaced successively with acetone and hexane to obtain a hexane-containing ASA-modified microfibrillated plant fiber.

A dumbbell test piece was produced by forming a composite with resin and molding in the same manner as in Example 3 except that the obtained hexane-containing ASA-modified microfibrillated plant fiber was used.

The elastic modulus and tensile strength of the obtained dumbbell test piece were measured in the same manner as in Example 1. Table 2 shows the measurement results.

Example 9

In the preparation of ASA-modified microfibrillated plant fiber in Example 3, after the reaction of the microfibrillated plant fiber with ASA, the reaction mixture was washed successively with acetone and ethanol to obtain an ethanol-containing ASA-modified microfibrillated plant fiber in which carboxyl group was modified with a potassium salt. The obtained ASA-modified microfibrillated plant fiber had a degree of substitution of 0.42. A dumbbell test piece was produced by forming a composite of ASA-modified microfibrillated plant fiber and HDPE and molding in the same manner as in Example 3 except that the obtained ethanol-containing ASA-modified microfibrillated plant fiber was used.

The elastic modulus and tensile strength of the obtained dumbbell test piece were measured in the same manner as in Example 1. Table 2 shows the measurement results.

Figure 8:
FIG. 8 is a TEM photograph of the molded article obtained in Example 9.

The obtained molded article was observed under a transmission microscope (TEM). FIG. 8 shows a TEM image.

Example 10

In the preparation of ASA-modified microfibrillated plant fiber in Example 3, after the reaction of the microfibrillated plant fiber with ASA, the reaction mixture was washed successively with acetone, ethanol, and water to obtain a water-containing ASA-modified microfibrillated plant fiber in which carboxyl group was modified with a potassium salt. The water-containing ASA-modified microfibrillated plant fiber was dispersed in water to provide a 3 mass % dispersion. While the dispersion was stirred, a 16 mass % aqueous calcium chloride solution was added, and stirring was continued for 1 hour to obtain a water-containing ASA-modified microfibrillated plant fiber in which carboxyl group was modified with a calcium salt. After the obtained fiber was suction-filtered, the solvent was replaced with isopropanol to obtain an isopropanol-containing ASA-modified microfibrillated plant fiber in which carboxyl group was modified with a calcium salt. The obtained ASA-modified microfibrillated plant fiber had a degree of substitution of 0.34. A dumbbell test piece was produced by forming a composite of ASA-modified microfibrillated plant fiber and resin and molding in the same manner as in Example 3 except that the obtained ASA-modified microfibrillated plant fiber was used.

The elastic modulus and tensile strength of the obtained dumbbell test piece were measured in the same manner as in Example 1. Table 2 shows the measurement results.

Further, the heat distortion temperature (HDT) was measured by using the method described below. Table 5 shows the results.

Example 11

In the preparation of ASA-modified microfibrillated plant fiber in Example 3, after the reaction of microfibrillated plant fiber with ASA, the reaction mixture was washed successively with acetone and ethanol to obtain 664 g (solids content: 104 g) of an ethanol-containing ASA-modified microfibrillated plant fiber in which carboxyl group was modified with a potassium salt. The obtained ASA-modified microfibrillated plant fiber had a degree of substitution of 0.37. The ASA-modified microfibrillated plant fiber was placed into a Trimix TX-5 (produced by Inoue Manufacturing Inc.), and 400 g of NMP was added. Ethanol was removed by distillation under reduced pressure with stirring. 38.8 g of iodomethane was added, and a reaction was allowed to proceed at 50° C. for 2 hours. After the reaction, the reaction mixture was washed successively with acetone, ethanol, acetic acid water, and water, and the solvent was replaced with ethanol to obtain an ethanol-containing ASA-modified microfibrillated plant fiber in which carboxyl group was esterified with methyl. A dumbbell test piece was produced by forming a composite of ASA-modified microfibrillated plant fiber and resin and molding in the same manner as in Example 3 except that the obtained ASA-modified microfibrillated plant fiber was used.

The elastic modulus and tensile strength of the obtained dumbbell test piece were measured in the same manner as in Example 1. Table 2 shows the measurement results.

Example 12

In the preparation of ASA-modified microfibrillated plant fiber in Example 3, after the reaction of the microfibrillated plant fiber with ASA, the reaction mixture was washed successively with acetone and ethanol to obtain 664 g (solids content: 104 g) of an ethanol-containing ASA-modified microfibrillated plant fiber in which carboxyl group was modified with a potassium salt. The obtained ASA-modified microfibrillated plant fiber had a degree of substitution of 0.37. The ASA-modified microfibrillated plant fiber was placed in a triple-blade stirring mixer (Trimix TX-5, produced by Inoue Manufacturing Inc.), and 400 g of NMP was added. Ethanol was removed by distillation under reduced pressure with stirring. Then, 130 g of iodooctane was added, and a reaction was allowed to proceed at 70° C. for 18 hours. After the reaction, the reaction mixture was washed successively with acetone, ethanol, aqueous acetic acid, and water, and the solvent was replaced with isopropanol to obtain an isopropanol-containing ASA-modified plant fiber in which carboxyl group was esterified with octyl. The obtained ASA-modified plant fibers had a degree of substitution of 0.37. A dumbbell test piece was produced by forming a composite of ASA-modified plant fiber and resin and molding in the same manner as in Example 3 except that the obtained ASA-modified microfibrillated plant fiber was used.

The elastic modulus and tensile strength of the obtained dumbbell test piece were measured in the same manner as in Example 1. Table 2 shows the measurement results.

Comparative Example 4

In the preparation of ASA-modified microfibrillated plant fiber in Example 3, after the reaction of microfibrillated plant fiber with ASA, the reaction mixture was washed successively with acetone, ethanol, aqueous acetic acid, and water to obtain a hydrous ASA-modified microfibrillated plant fiber.

The hydrous ASA-modified microfibrillated plant fiber (solids concentration: 20 mass %), MAPP (trade name Toyotac PMA H1000P, produced by Toyobo Co., Ltd.), and high-density polyethylene (HDPE, trade name Flo-beads HE3040, produced by Sumitomo Seika Chemicals Co., Ltd.) were stirred using a mixer for 1 minute.

Based on solids, the proportions of components in the mixture are as follows:
ASA-modified microfibrillated plant fiber: 54 mass % (microfibrillated plant fiber-derived portion (30 mass %)+ASA-modified portion (24 mass %));
resin: 42 mass % (MAPP: (12.9 mass %)+HDPE (29.1 mass %)); and
calcium carbonate: 4 wt. %.

The obtained resin composition was passed twice through a twin-screw extruder produced by Technovel Corporation (KZW, screw diameter: 15 mm, L/D: 45, screw rotation: 200 rpm, number of blocking structures: zero, processing speed: 200 g/hr) at 98° C. to perform dehydration and mixing. Subsequently, the mixture was passed once through the extruder at 140° C., and the obtained melt-kneaded product was pelletized using a pelletizer (produced by Technovel Corporation). The pellet was then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 160° C. and a mold temperature of 40° C.

The elastic modulus and tensile strength of the obtained dumbbell test piece were measured in the same manner as in Example 1. Table 2 shows the measurement results. Further, the average linear expansion coefficient was measured by using the method described below. Table 3 shows the results.

Figure 9:
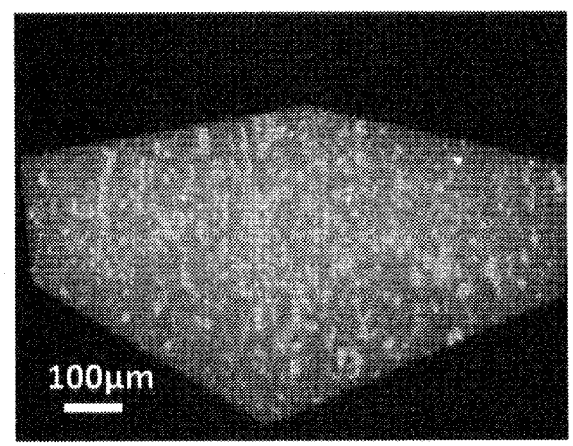
FIG. 9 shows an X-ray CT scanner image of the molded article obtained in Comparative Example 4.

The obtained molded article was observed as in Example 1 by using an X-ray CT scanner. FIG. 9 shows an X-ray CT scanner image.

TABLE 2

| | ASA-modified microfibrillated plant fibers | | | Resin molded article | | |
| --- | --- | --- | --- | --- | --- | --- |
| Example | DS | Solvent contained | Modification of carboxyl group | Proportion of ASA-modified microfibrillated plant fiber (mass %) | Elastic modulus (GPa) | Tensile strength (MPa) |
| Example 3 | 0.40 | EtOH | H | 18 | 2.77 | 52.1 |
| Example 4 | 0.39 | IPA | H | 17.8 | 3.43 | 56.2 |
| Example 5 | 0.39 | Acetone | H | 17.8 | 2.88 | 52.8 |
| Example 6 | 0.34 | Dioxane | H | 16.8 | 2.19 | 50.1 |
| Example 7 | 0.34 | Ethyl acetate | H | 16.8 | 2.40 | 51.2 |
| Example 8 | 0.34 | Hexane | H | 16.8 | 2.10 | 47.4 |
| Example 9 | 0.42 | EtOH | K | 18.3 | 3.44 | 53.7 |
| Example 10 | 0.34 | IPA | Ca | 16.8 | 2.92 | 55.1 |
| Example 11 | 0.37 | EtOH | Methyl | 17.7 | 2.89 | 56.2 |
| Example 12 | 0.37 | IPA | Octyl | 19.9 | 2.68 | 57.8 |
| Comparative Example 4 | 0.40 | Water | H | 18 | 1.37 | 37.6 |

Measurement of the Average Linear Expansion Coefficient

The center portion (4 mm in length, 1 mm in width, 20 mm in height) of each of the dumbbell test pieces with a thickness of 1 mm obtained in Example 3 and Comparative Examples 1, 2, and 4 was cut out, and the average linear expansion coefficient of each was measured using a thermomechanical analyzer (EXSTAR TMA/SS6100, produced by SII NanoTechnology Inc.). Table 3 shows the results.

Conditions: In tensile mode at a load of 3 gf with a span of 20 mm and in a nitrogen atmosphere, each test piece was heated from 20° C. to 100° C. at a temperature increase rate of 5° 12/min, then cooled to −20° C., and heated again at a temperature increase rate of 5° 12/min to determine the average linear expansion coefficient from 0° C. to 60° C.

TABLE 3

| | Average linear expansion coefficient (ppm/K) |
|---|---|
| Example 3 | 47 |
| Comparative Example 1 | 248 |
| Comparative Example 2 | 240 |
| Comparative Example 4 | 110 |

Thermal Conductivity

The dumbbell test pieces with a thickness of 1 mm obtained in Example 3 and Comparative Example 2 were cut out into cylinders with a diameter of 5 mm and a thickness of 1 mm in such a manner that the thickness direction was perpendicular to the injection direction.

The density of the obtained measurement samples was measured by using the Archimedes method, and the specific heat and thermal diffusivity of each sample were also measured using a laser-flash thermal measurement device (LFA-502, produced by Kyoto Electronics Manufacturing Co., Ltd.). The thermal conductivity was calculated as the product of the density, specific heat, and thermal diffusivity. Table 4 shows the results.

TABLE 4

| | Thermal conductivity (W/m · K) |
|---|---|
| Example 3 | 1.33 |
| Comparative Example 2 | 0.55 |

Heat Distortion Temperature (HDT Measurement)

The heat distortion temperature (HDT) of each of 4-mm-thick strip-shaped test pieces obtained in Examples 3 and 10, Comparative Examples 1 and 2 was measured using an HDT test apparatus (6M-2, produced by Toyo Seiki Seisaku-sho, Ltd.) according to a flat-wise method. Table 5 shows the results.

Conditions: span of 64 mm, load flexural stress of 0.45 MPa, test starting temperature of 30° C., temperature increase rate of 120° C./h.

TABLE 5

| | HDT (° C.) |
|---|---|
| Example 3 | 109 |
| Example 10 | 114 |
| Comparative Example 1 | 81 |
| Comparative Example 2 | 78 |

Results and Discussion

The results show that when a master batch was produced after defibrating NBKP as in Example 3, both the elastic modulus and tensile strength were enhanced, compared to Comparative Example 4, in which water was contained.

The results further show that when ASA-modified microfibrillated plant fiber and HDPE were mixed using isopropanol, acetone, dioxane, ethyl acetate, or hexane as an organic liquid as in Examples 4 to 8, both the elastic modulus and tensile strength were enhanced, compared to Comparative Example 4, in which water was contained.

Further, as shown in FIGS. 6 and 9, the molded article obtained in Example 3 by mixing and kneading ASA-modified CNF and resin in an organic liquid (C) had microfibrillated plant fiber dispersed in the resin more uniformly, compared to Comparative Example 4, in which water was contained.

Further, FIGS. 7 and 8 confirmed that the molded articles obtained in Examples 3 and 9 had lamellae of HDPE formed in them, and the lamellae were regularly layered in a direction different from the fiber length direction of the microfibrillated plant fiber. FIGS. 7 and 8 further confirmed that the molded article obtained in Example 3 comprises uniaxially oriented HDPE fibrous cores that were oriented in the same direction as the fiber length of the microfibrillated plant fiber, and HDPE lamellae were layered between the microfibrillated plant fiber and fibrous cores and oriented in a direction different from the fiber length of the microfibrillated plant fiber. Further, FIG. 10 confirmed that in Comparative Example 2, HDPE-specific lamellae were irregularly located, unlike the lamellae shown in FIGS. 7 and 8.

The heat conductivity of each of the test pieces obtained in Example 3 and Comparative Example 2 was measured. The heat conductivities of the test pieces obtained in Example 3 and Comparative Example 2 were 1.33 W/m·K and 0.55 W/m·K, respectively. The results show that heat conductivity of HDPE was enhanced by forming a composite of the ASA-modified CNF and HDPE.

The results of heat distortion temperature (HDT) in Table 5 show that the composite material comprising ASA-modified CNF had higher HDT, i.e., higher heat resistance, than HDPE resin alone. The results also show that converting carboxyl group of ASA from carboxylic acid to calcium carboxylate enhances heat resistance.

Further, the composite material obtained in Example 1 had a heat distortion temperature that was about 30° C. higher than the resin alone in Comparative Examples 1 and 2, which indicates that the composite material comprising ASA-modified microfibrillated plant fiber and resin has enhanced heat resistance.

Further, comparing Example 3, Comparative Example 4, and Comparative Example 1 shows that when ASA-modified CNF and resin were mixed and kneaded in an organic liquid (C), the ASA-modified CNF can be more uniformly dispersed, compared to using a resin alone or mixing ASA-modified NBKP and resin under hydrous conditions in an organic liquid (C) and then kneading as in Example 1, thus providing a composite material having a very small average linear expansion coefficient.

Example 13

Preparation of ASA-Modified Plant Fiber

After 8,000 g of NMP was added to 10,000 g (2,000 g of solids) of the (refiner-treated) hydrous NBKP prepared in Example 1 and placed into a Trimix TX-50 (produced by Inoue Manufacturing, Inc.), stirring was started and the mixture was dehydrated under reduced pressure at 40 to 50° C. Subsequently, 1,988 g of T-NS135 (ASA having 16 carbon atoms, except for the number of carbon atoms of succinic anhydride, produced by Seiko PMC Corporation) and 170 g of potassium carbonate were added, and the mixture was allowed to react at 62° C. for 1.5 hours. After the reaction, the mixture was washed with ethanol to obtain an ethanol-containing ASA-modified NBKP in which some carboxyl groups were in the form of potassium salts. The obtained ASA-modified NBKP had a degree of substitution of 0.37.

Ethanol was added to the obtained ethanol-containing ASA-modified NBKP to adjust the solids concentration to 3.0 mass %. The ASA-modified NBKP (solids content: 52.1 g) dispersed in ethanol was mixed in a beaker under propeller agitation with a dispersion prepared by adding ethanol to each of 35.9 g of polylactic acid (PLA) (Uz S-12, produced by Toyota Motor Co., Ltd.), 6 g of a crystal nucleating agent (trade name Ecopromote, produced by Nissan Chemical Industries, Ltd.), and 6 g of an antioxidant (trade name Carbodilite, produced by Nisshinbo Industries, Inc.) to adjust the solids concentration to 10.0 mass %. The obtained resin mixture dispersion was suction-filtered and then dried under reduced pressure while stirring using the Trimix. A mixture of ASA-modified NBKP and resin (a master batch) was thereby obtained.

Based on solids, the proportions of components in the mixture are as follows:

ASA-modified NBKP: 52.1 mass % (NBKP-derived portion: 30 mass %+ASA-derived portion (22.1 mass %));

PLA: 35.9 mass %;

crystal nucleating agent: 6 wt. %; and antioxidant: 6 wt. %.

Subsequently, 100 g of the obtained master batch and 200 g of PLA (Uz S-12, produced by Toyota Motor Co., Ltd.) were passed once through a twin-screw extruder produced by Technovel Corporation (KZW, screw diameter: 15 mm, L/D: 45, screw rotation: 200 rpm, number of blocking structures: zero, processing speed: 200 g/hr) at 180° C. The obtained melt-kneaded product was pelletized using a pelletizer (produced by Technovel Corporation), and then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 190° C. and a mold temperature of 40° C. Based on solids, the proportions of components in the final resin composition are as follows.

ASA-modified NBKP: 17.4 mass % (NBKP-derived portion (10 mass %)+ASA-derived portion (7.4 mass %));

PLA: 78.6 mass %;

crystal nucleating agent: 2 mass %; and antioxidant: 2 mass %.

The elastic modulus and tensile strength of the obtained dumbbell test piece were measured in the same manner as in Example 1. Table 6 shows the measurement results.

Comparative Example 5

A dumbbell test piece was produced by molding in the same manner as in Example 13 except that only PLA powder (Uz S-12, produced by Toyota Motor Corporation) was used without using ASA-modified NBKP.

The elastic modulus and tensile strength of the obtained dumbbell test piece were measured in the same manner as in Example 1. Table 6 shows the measurement results.

Comparative Example 6

A dumbbell test piece was produced by forming a composite and molding in the same manner as in Example 13 except that unmodified ethanol-containing NBKP was used.

The elastic modulus and tensile strength of the obtained dumbbell test piece were measured in the same manner as in Example 1. Table 6 shows the measurement results.

TABLE 6

| | ASA-modified microfibrillated plant fiber | | | Resin molded article | | |
| --- | --- | --- | --- | --- | --- | --- |
| | | | | Proportion of ASA-modified | | |
| Example | DS | Solvent contained | Modification of carboxyl group | microfibrillated plant fiber (mass %) | Elastic modulus (Gpa) | Tensile strength (Mpa) |
| Example 13 | 0.37 | EtOH | H/K | 17.4 | 5.60 | 83.9 |
| Comparative Example 5 | — | — | — | — | 2.84 | 60.1 |
| Comparative Example 6 | 0 | EtOH | — | 10 | 4.43 | 79.7 |

Results and Discussion

The results clearly show that as with forming a composite of HDPE and ASA-modified NBKP, defibration of NBKP to a nano level and uniform dispersion proceeded further in Example 13, in which ASA-modified NBKP and PLA were mixed using an organic liquid, compared to Comparative Example 6, which used unmodified pulp, and therefore, both the elastic modulus and tensile strength were enhanced.

Example 14

Formation of Composite with Biopolyethylene

A resin composition was produced in the same manner as in Example 3 except that Biomass HDPE (trade name SHA7260, produced by Braskem) was used in place of HDPE (SUNTEC-HD J320, produced by Asahi Kasei Chemicals Corporation) when the master batch obtained in Example 3 was melt-kneaded.

The elastic modulus and tensile strength of the obtained dumbbell test piece were measured in the same manner as in Example 1. Table 7 shows the measurement results.

Comparative Example 7

A dumbbell test piece was obtained by molding in the same manner as in Comparative Example 2 except that Biomass HDPE (trade name SHA7260, produced by Braskem) was used in place of HDPE powder (Flo-Beads HE3040, produced by Sumitomo Seika Chemicals Co., Ltd.) in Comparative Example 2.

The elastic modulus and tensile strength of the obtained dumbbell test piece were measured in the same manner as in Example 1. Table 7 shows the measurement results.

TABLE 7

| | ASA-modified microfibrillated plant fiber | | | Resin molded article | | |
|---|---|---|---|---|---|---|
| Example | DS | Solvent contained | Modification of carboxyl group | Proportion of ASA-modified microfibrillated plant fiber (mass %) | Elastic modulus (Gpa) | Tensile strength (Mpa) |
| Example 14 | 0.40 | EtOH | H | 18 | 2.41 | 47.6 |
| Comparative Example 7 | — | — | — | — | 0.68 | 20.9 |

Results and Discussion

The results clearly show that both the elastic modulus and tensile strength were enhanced in Example 14, in which ASA-modified microfibrillated plant fiber and bio PE were mixed, compared to Comparative Example 7, in which only bio PE was used.

Example 15

Formation of Composite with Polyamide

Ethanol was added to the ASA-modified NBKP obtained by using the same method as in Example 13 to adjust the solids concentration to 3.0 mass %. The ASA-modified microfibrillated plant fiber (solids content: 52.1 g) dispersed in ethanol was mixed in a beaker under propeller agitation with a dispersion prepared by dispersing 47.9 g of Polyamide 12 (PA12) (trade name Vestosint 2159, produced by DICEL-Evonik Ltd., mean particle diameter: 10 μm, viscosity number: 120 mg/l) in ethanol to adjust the solids concentration to 10.0 mass %. The obtained resin mixture dispersion was suction-filtered and then dried under reduced pressure while stirring using a Trimix. A mixture (a master batch) of the ASA-modified microfibrillated plant fiber and resin was thereby obtained.

Based on solids, the proportions of components in the mixture are as follows.

ASA-modified microfibrillated plant fiber: 52.1 mass % (microfibrillated plant fiber-derived portion (30 mass %))+ ASA-derived portion (22.1 mass %)); and PA12: 47.9 mass %.

A mixture of 100 g of the obtained master batch and 200 g of PA12 (trade name Vestosint 2159, produced by DICEL-Evonik Ltd., mean particle diameter: 10 μm, viscosity: 120 mg/l) was passed once through a twin-screw extruder produced by Technovel Corporation (KZW, screw diameter: 15 mm, L/D: 45, screw rotation: 200 rpm, number of blocking structures: zero, processing speed: 200 g/hr) at 180° C., and the obtained melt-kneaded product was pelletized using a pelletizer (produced by Technovel Corporation), and then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 180° C. and a mold temperature of 40° C.

Based on solids, the proportions of the components in the final resin composition are as follows.

ASA-modified microfibrillated plant fiber: 17.4 mass % (microfibrillated plant fiber-derived portion (10 mass %)+ASA-derived portion (7.4 mass %)); and PA12: 82.6 mass %.

Figure 11:
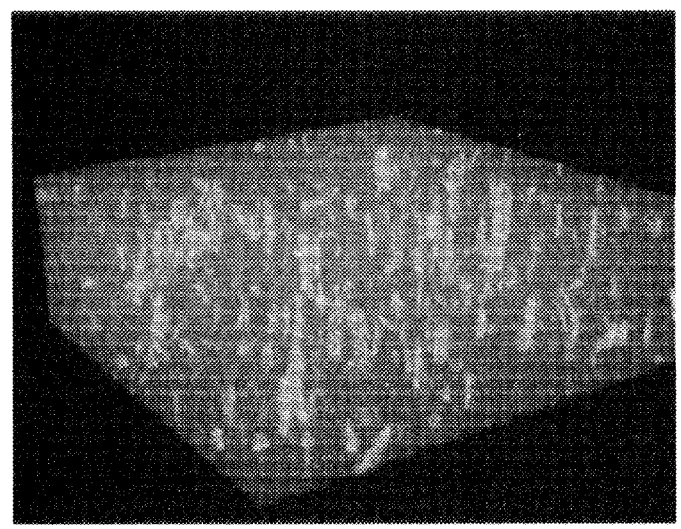
FIG. 11 shows an X-ray CT scanner of the molded article obtained in Example 15.

The obtained molded article was observed using an X-ray CT scanner (SkyScan 1172, produced by SkyScan). FIG. 11 shows an X-ray CT scanner image.

The elastic modulus and tensile strength of the obtained dumbbell test piece were measured in the same manner as in Example 1. Table 8 shows the measurement results.

Further, the average linear expansion coefficient from 0° C. to 60° C. was measured in the same manner as in Example 3. Table 9 shows the results.

Comparative Example 8

A dumbbell test piece was produced by molding in the same manner as in Example 15 except that only PA12 was used without using ASA-modified NBKP.

The elastic modulus and tensile strength of the obtained dumbbell test piece were measured in the same manner as in Example 1. Table 8 shows the measurement results.

Comparative Example 9

A dumbbell test piece was produced by forming a composite and molding in the same manner as in Example 15 except that unmodified ethanol-containing NBKP was used.

Figure 12:
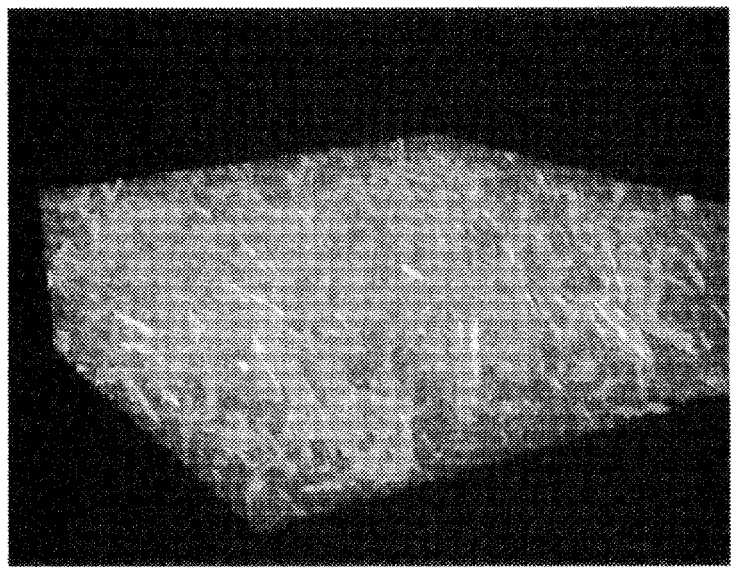
FIG. 12 shows an X-ray CT scanner image of the molded article obtained in Comparative Example 9.

The obtained molded article was observed in the same manner as in Example 15 by using an X-ray CT scanner. FIG. 12 shows an X-ray CT scanner image.

The elastic modulus and tensile strength of the obtained dumbbell test piece were measured in the same manner as in Example 1. Table 8 shows the measurement results. Further, the average linear expansion coefficient from 0° C. to 100° C. was measured in the same manner as in Example 3. Table 9 shows the results.

TABLE 8

| | ASA-modified microfibrillated plant fiber | | | Resin molded article | | |
|---|---|---|---|---|---|---|
| | DS | Solvent contained | Modification of carboxyl group | Proportion of ASA-modified microfibrillated plant fiber (mass %) | Elastic modulus (Gpa) | Tensile strength (Mpa) |
| Example 15 | 0.37 | EtOH | H/K | 17.4 | 2.95 | 62.8 |
| Comparative Example 8 | — | — | — | — | 1.27 | 35.0 |
| Comparative Example 9 | 0 | EtOH | — | 10 | 1.79 | 41.5 |

TABLE 9

| | Average linear expansion coefficient (ppm/K) |
|---|---|
| Example 15 | 33 |
| Comparative Example 9 | 92 |

Results and Discussion

The results clearly show that as with forming a composite of HDPE and ASA-modified NBKP, defibration of NBKP to a nano level and uniform dispersion proceeded further in Example 15, in which ASA-modified NBKP and PA12 were mixed using an organic liquid, compared to Comparative Example 9, which used unmodified pulp, and therefore, both the elastic modulus and tensile strength were enhanced.

As shown in FIGS. 11 and 12, the molded article obtained in Example 15 by mixing and kneading the ASA-modified CNF and resin in an organic liquid (C) had microfibrillated plant fiber dispersed in the resin more uniformly, compared to Comparative Example 9, in which water was contained.

Further, as is clear from comparing Example 15 and Comparative Example 9, a composite material having a very small average linear expansion coefficient can be produced by uniformly dispersing ASA-modified NBKP in the resin.

Example 16

Formation of Composite with Polyacetal Resin

In the preparation of ASA-modified microfibrillated plant fiber in Example 3, after the reaction of microfibrillated plant fiber with ASA, the reaction mixture was washed successively with acetone, ethanol, and water, and water-containing ASA-modified microfibrillated plant fiber in which carboxyl group was modified with a potassium salt were obtained. This fiber was dispersed in water to obtain a 3 mass % dispersion. While the dispersion was stirred, a 16 mass % calcium chloride aqueous solution was added, and stirring was continued for 1 hour to obtain a water-containing ASA-modified microfibrillated plant fiber in which carboxyl group was modified with a calcium salt. After the fiber was suction-filtered, the solvent was replaced with isopropanol to obtain an ethanol-containing ASA-modified plant fiber. The obtained ASA-modified microfibrillated plant fiber had a degree of substitution of 0.34. Isopropanol was added to the obtained ASA-modified microfibrillated plant fiber to adjust the solids concentration to 3.0 mass %. The ASA-modified microfibrillated plant fiber (solids content: 54 g) dispersed in isopropanol was mixed in a beaker under propeller agitation with a dispersion prepared by dispersing 46 g of polyoxymethylene (POM) (trade name F30-01, produced by Mitsubishi Engineering-Plastics Corporation, mean particle diameter: 12 μm) in ethanol to adjust the solids concentration to 10.0 mass %. The obtained resin mixture dispersion was suction-filtered and then dried under reduced pressure while stirring using a Trimix, to obtain a mixture (a master batch) of the ASA-modified microfibrillated plant fiber and resin.

Based on solids, the proportions of components in the mixture are as follows.

ASA-modified microfibrillated plant fiber: 50.3 mass % (microfibrillated plant fiber-derived portion (30 mass %)+ASA-derived component (20.3 mass %)), and POM: 49.7 mass %

Subsequently, a mixture of 100 g of the obtained master batch and 200 g of POM (trade name F30-01, produced by Mitsubishi Engineering-Plastics Corporation, mean particle diameter: 12 mm) was passed once through a twin-screw extruder produced by Technovel Corporation (KZW, screw diameter: 15 mm, L/D: 45, screw rotation: 200 rpm, number of blocking structures: zero, processing speed: 200 g/hr) at 170° C., and the obtained melt-kneaded product was pelletized using a pelletizer (produced by Technovel Corporation), and then placed into an injection molder (produced by Nissei Plastic Industrial Co., Ltd.) to obtain a strip test piece (10 mm in width, 4 mm in thickness, and 80 mm in length). The molding was performed at a heating barrel (cylinder) temperature of 180° C. and a mold temperature of 35° C.

Based on solids, the proportions of the components in the final resin composition are as follows.

ASA-modified microfibrillated plant fiber: 16.8 mass % (microfibrillated plant fiber-derived portion) (10 mass %)+ASA-derived portion (6.8 mass %); and POM: 83.2 mass %.

The flexural strength and bending elastic modulus of the obtained dumbbell test piece were measured by the following methods. Table 10 shows the measurement results.

Bending Elastic Modulus and Flexural Strength

The bending elastic modulus and flexural strength of the molded article were measured (load cell: 100 N) at a deformation rate of 10 mm/min. An Autograph AG-5000E universal testing machine (AG-X refreshed) (produced by Shimadzu Corporation) was used as a measuring instrument.

Comparative Example 10

A dumbbell test piece was produced by molding in the same manner as in Example 16 except that only the POM powder (trade name F30-01, produced by Mitsubishi Engineering-Plastics Corporation, mean particle diameter: 12 μm) was used without using ASA-modified microfibrillated plant fiber.

The bending elastic modulus and flexural strength of the obtained dumbbell test piece were measured in the same manner as in Example 16. Table 10 shows the measurement results.

Comparative Example 11

A dumbbell test piece was produced by forming a composite and molding in the same manner as in Example 16 except that unmodified ethanol-containing microfibrillated plant fiber was used.

The bending elastic modulus and flexural strength of the obtained dumbbell test piece were measured in the same manner as in Example 16. Table 10 shows the measurement results.

pelletized using a pelletizer (produced by Technovel Corporation), and then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 160° C. and a mold temperature of 40° C.

Based on solids, the proportions of components in the final resin composition are as follows.

ASA-modified microfibrillated plant fiber: 18.0 mass % (microfibrillated plant fiber-derived portion (10 mass %)+ASA-derived portion (8.0 mass %)), resin: 80.7 mass % (MAPP (4.3 mass %)+HDPE (9.7 mass %)+PP (66.7 mass %)), and calcium carbonate: 1.3 wt %.

TABLE 10

| | ASA-modified microfibrillated plant fiber | | | Resin molded article | | |
|---|---|---|---|---|---|---|
| | DS | Dispersing solvent | Modification of carboxyl group | Proportion of ASA-modified microfibrillated plant fiber (mass %) | Bending elastic modulus (GPa) | Flexural strength (MPa) |
| Example 16 | 0.34 | IPA | Ca | 16.8 | 4380 | 98.6 |
| Comparative Example 10 | — | — | — | — | 2220 | 75.5 |
| Comparative Example 11 | 0 | EtOH | — | 10 | 3650 | 106 |

Result and Discussion

The results clearly show that as with forming a composite of HDPE and ASA-modified NBKP, defibration of NBKP to a nano level and uniform dispersion proceeded further in Example 16, in which ASA-modified NBKP and POM were mixed using an organic liquid (C), compared to Comparative Example 10, which used unmodified pulp, and therefore, both the bending elastic modulus and flexural strength were enhanced.

Example 17

Formation of Composite with Polypropylene 100 g of the mixture (master batch) of ASA-modified microfibrillated plant fiber and resin obtained in Example 3 and 200 g of polypropylene (PP) (trade name Wintec WF-X6, produced by Japan Polypropylene Corporation, melting point: 125° C.) were passed once through a twin-screw kneader produced by Technovel Corporation (KZW, screw diameter: 15 mm, L/D: 45, screw rotation: 200 rpm, number of blocking structures: zero, processing speed: 200 g/hr) at 140° C., and the obtained melt-kneaded product was The elastic modulus and tensile strength of the obtained dumbbell test piece were measured in the same manner as in Example 1. Table 11 shows the measurement results.

Comparative Example 12

A dumbbell test piece was produced by molding in the same manner as in Example 17 except that only a PP pellet (trade name Wintec WF-X6, produced by Japan Polypropylene Corporation) was used without using the mixture (master batch) of ASA-modified microfibrillated plant fiber and resin in Example 17.

The elastic modulus and tensile strength of the obtained dumbbell test piece were measured in the same manner as in Example 1. Table 11 shows the measurement results.

TABLE 11

| | ASA-modified microfibrillated plant fiber | | | Resin molded article | | |
|---|---|---|---|---|---|---|
| | DS | Solvent contained | Modification of carboxyl group | Proportion of ASA-modified microfibrillated plant fiber (mass %) | Elastic modulus (GPa) | Tensile strength (MPa) |
| Example 17 | 0.40 | EtOH | H | 18.0 | 1.68 | 44.1 |
| Comparative Example 12 | — | — | — | — | 0.68 | 25.7 |

Results and Discussion

The results clearly show that both the elastic modulus and tensile strength were enhanced in Example 17, in which ASA-modified microfibrillated plant fiber and PP were mixed, compared to Comparative Example 12, which used only PP resin.

Example 18

Formation of Composite with Low-Density Polyethylene (LDPE)

A resin composition comprising ASA-modified microfibrillated plant fiber was produced in the same manner as in Example 3 except that LDPE (trade name SUNTEC-LD L6810, produced by Asahi Chemical Chemicals) was used in place of high-density polyethylene (HDPE) (trade name Flo-beads HE3040, produced by Sumitomo Seika Chemicals Co., Ltd.) in the production of a mixture (a master batch) of ASA-modified microfibrillated plant fiber and resin. Further LDPE (trade name SUNTEC-LD L6810, produced by Asahi Kasei Chemicals Corporation) was used in place of HDPE (trade name SUNTEC-HD J320, produced by Asahi Kasei Chemicals Corporation) to be mixed with the master batch in Example 3.

Based on solids, the proportions of the components in the final resin composition are as follows.

ASA-modified microfibrillated plant fiber: 18.0 mass % (microfibrillated plant fiber-derived portion (10 mass %)+ASA-derived portion (8.0 mass %)), resin: 80.7 mass % (MAPP (4.3 mass %)+LDPE (76.4 mass %)), and calcium carbonate: 1.3 wt. %.

The elastic modulus and tensile strength of the obtained dumbbell test piece were measured in the same manner as in Example 1. Table 12 shows the measurement results.

Comparative Example 13

A dumbbell test piece was produced by molding in the same manner as in Example 18 using only LDPE (trade name SUNTEC LDL6810, produced by Asahi Kasei Chemicals Corporation) without using the mixture (master batch) of ASA-modified microfibrillated plant fiber and resin in Example 15.

The elastic modulus and tensile strength of the obtained dumbbell test piece were measured in the same manner as in Example 1. Table 12 shows the test results.

TABLE 12

| | ASA-modified microfibrillated plant fiber | | | Resin molded article | | |
|---|---|---|---|---|---|---|
| | DS | Solvent contained | Modification of carboxyl group | Proportion of ASA-modified microfibrillated plant fiber (mass %) | Elastic modulus (Gpa) | Tensile strength (Mpa) |
| Example 18 | 0.40 | EtOH | H | 18.0 | 0.59 | 24.5 |
| Comparative Example 13 | — | — | — | — | 0.15 | 19.6 |

Results and Discussion

The results clearly indicate that both the elastic modulus and tensile strength were enhanced in Example 18, in which ASA-modified microfibrillated plant fiber and LDPE were mixed, compared to Comparative Example 13, which used only PP resin.

Example 19

Preparation of Alkenyl Succinic Anhydride (ASA)-Modified Plant Fiber

The solvent of 100 g (solids content: 20 g) of the hydrous (refiner-treated) NBKP obtained in Example 1 was replaced with dimethyl sulfoxide (DMSO). After this test sample was adjusted to a solids concentration of 20 mass % and placed into a Trimix TX-1 (produced by Inoue Manufacturing Inc.), an ASA-modification reaction was performed in the same manner as in Example 1. After the reaction, the reaction mixture was washed successively with acetone, ethanol, acetic acid water, and water, and the solvent was replaced with IPA to obtain an IPA-containing ASA-modified plant fiber (ASA-modified NBKP). The obtained ASA-modified NBKP had a degree of substitution (DS) of 0.30.

IPA was added to the obtained IPA-containing ASA-modified NBKP to adjust the solids concentration to 3.0 mass %. 34.8 g of high-density polyethylene (HDPE, trade name SUNTEC-HD J320, produced by Asahi Kasei Chemicals Corporation, finely pulverized material) and IPA were added to the ASA-modified NBKP (solids content: 31.9 g) dispersed in IPA to prepare a dispersion having a solids concentration of 10.0 mass %. The dispersion was mixed with stirring in a beaker. After the obtained resin mixture dispersion was suction-filtered, the filtrate was dried under reduced pressure while stirring with a Trimix. A mixture (a master batch) of the ASA-modified NBKP and resin was thereby obtained.

Based on solids, the proportions of components in the mixture are as follows.

ASA-modified NBKP: 47.8 mass % (NBKP-derived component (30 mass %)+ASA-derived component (17.8 mass %); and resin: HDPE (52.2 mass %).

Subsequently, a mixture of 30 g of the obtained master batch and 60 g of HDPE (trade name SUNTEC-HD J320, produced by Asahi Kasei Chemicals Corporation) was passed once through a twin-screw kneader produced by Technovel Corporation (KZW, screw diameter: 15 mm, L/D: 45, screw rotation: 200 rpm, number of blocking structures: zero, processing speed: 200 g/hr) at 140° C., and the obtained melt-kneaded product was pelletized using a pelletizer (produced by Technovel Corporation), and then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 160° C. and a mold temperature of 40° C.

Based on solids, the proportions of components in the final resin composition are as follows.

ASA-modified plant fiber: 16.0 mass % (NBKP-derived portion (10 mass %)+ASA-derived portion (6.0 mass %)), resin: HDPE (84.0 mass %).

The elastic modulus and tensile strength of the obtained dumbbell test piece were measured in the same manner as in Example 1. Table 13 shows the measurement results.

TABLE 13

| | ASA-modified microfibrillated plant fiber | | | Resin molded article | | |
|---|---|---|---|---|---|---|
| | DS | Swelling solvent | Modification of carboxyl group | Proportion of ASA-modified plant fiber (mass %) | Elastic modulus (GPa) | Tensile strength (MPa) |
| Example 19 | 0.30 | DMSO | H | 16 | 2.71 | 45.6 |
| Comparative Example 2 | — | — | — | — | 0.82 | 23.4 |
| Comparative Example 3 | 0 | — | — | 10 | 1.64 | 37.8 |

Results and Discussion

The results clearly show that both the elastic modulus and tensile strength were enhanced in Example 19, in which DMSO was used as a solvent for swelling the plant fiber during ASA modification, compared to Comparative Example 2, which used only HDPE, or to Comparative Example 3, in which HDPE and unmodified NBKP were formed into a composite.

Example 20

Preparation of Thermally Degraded Product of Polypropylene 700 g of polypropylene (PP, trade name Novatec MA3Q, produced by Japan Polypropylene Corporation) was placed into a flask and heated with a gas burner at 380 to 420° C. The generated gas was cooled to obtain 550 g of a liquid at ordinary temperature. The obtained liquid was subjected to gas chromatography mass spectrometry using a gas chromatography mass spectroscope (GCMS-QP2010 Ultra, produced by Shimadzu Corporation). The main component was found to be a propylene oligomer having about 9 to 21 carbon atoms and having an unsaturated bond at an end. The low-boiling point components of the obtained propylene oligomer were distilled off under reduced pressure at 80 hPa and 70° C. to obtain 380 g of a thermally degraded product of polypropylene (a thermally degraded PP) having about 18 carbon atoms on average (analyzed by 1H NMR).

Synthesis of Alkenyl Succinic Anhydride Having a PP Structure 133 g of maleic anhydride was added to 380 g of thermally degraded PP, and a reaction was allowed to proceed at 200° C. under an atmosphere of nitrogen for 16 hours. After the reaction, the reaction mixture was added dropwise to hexane, and the insoluble part was removed using a membrane filter (H010A090C, produced by Advantech Co., Ltd.), and the obtained filtrate was concentrated to obtain 350 g of alkenyl succinic anhydride (thermally degraded PP-ASA) having a PP structure.

Preparation of Modified Microfibrillated Plant Fiber

A modification reaction was performed in the same manner as in the preparation of ASA-modified microfibrillated plant fiber in Example 3 except that a thermally degraded PP-ASA was used as a modifying agent. After the reaction, the mixture was washed successively with hexane, acetone, and ethanol to obtain an ethanol-containing modified microfibrillated plant fiber in which carboxyl group was modified with a potassium salt. The obtained modified microfibrillated plant fiber had a degree of substitution (DS) of 0.41. The fiber was placed into a Trimix TX-5 (produced by Inoue Manufacturing Inc.), and NMP was added. After ethanol was removed by distillation under reduced pressure with stirring, iodomethane was added and a reaction was allowed to proceed at 50° C. After the reaction, the reaction mixture was washed successively with acetone, ethanol, aqueous acetic acid, and water, and the solvent was replaced with IPA to obtain an IPA-containing modified microfibrillated plant fiber in which carboxyl group was esterified with methyl group.

A mixture (a master batch) of modified microfibrillated plant fiber and resin was prepared in the same manner as in Example 19 except that the obtained IPA-containing modified microfibrillated plant fiber was mixed with PP (trade name Novatec MA04A, produced by Japan Polypropylene Corporation, finely pulverized material) used as a resin.

Based on solids, the proportions of components in the mixture are as follows.

Modified microfibrillated plant fiber: 58.5 mass % (microfibrillated plant fiber-derived component (30 mass %)+PP-ASA-derived component (28.5 mass %), and resin: PP (41.5 mass %).

Subsequently, a mixture of 30 g of the obtained master batch and 60 g of PP (trade name Novatec MA04A, produced by Japan Polypropylene Corporation) was passed once through a twin-screw kneader produced by Technovel Corporation (KZW, screw diameter: 15 mm, L/D: 45, screw rotation: 200 rpm, number of blocking structures: zero, processing speed: 200 g/hr) at 180° C. The obtained melt-kneaded product was pelletized using a pelletizer (produced by Technovel Corporation), and then placed into an injection molder (NPX7-1F, produced by Nissei Plastic Industrial Co., Ltd.) to obtain a dumbbell test piece (thickness: 1 mm). The molding was performed at a heating barrel (cylinder) temperature of 170° C. and a mold temperature of 40° C.

Based on solids, the proportions of components in the final resin composition are as follows.

Modified microfibrillated plant fiber: 19.5 mass % (microfibrillated plant fiber-derived component (10 mass %))+PP-ASA-derived portion (9.5 mass %), and resin: 80.5 mass %.

The elastic modulus and tensile strength of the obtained dumbbell test piece were measured in the same manner as in Example 1. Table 14 shows the measurement results.

Example 21

A dumbbell test piece was produced by forming a composite of modified microfibrillated plant fiber and resin and molding in the same manner as in Example 20 except that the modified microfibrillated plant fiber obtained in the preparation of modified microfibrillated plant fiber in Example 20 was used and 0.3 g of an antioxidant (trade name Irganox 1010, produced by BASF Japan Ltd.) was added when kneading was performed.

Based on solids, the proportions of components in the final resin composition are as follows.

Modified microfibrillated plant fiber: 19.5 mass % (microfibrillated plant fiber-derived portion (10 mass %))+PP-ASA-derived portion (9.5 mass %),
  antioxidant: 0.3 g, and
  resin: 80.2 mass %.

The elastic modulus and tensile strength of the obtained dumbbell test piece were measured in the same manner as in Example 1. Table 14 shows the measurement results.

Comparative Example 14

A dumbbell test piece was produced by molding in the same manner as in Example 20 using only PP pellet (trade name Novatec MA04A, produced by Japan Polypropylene Corporation) without using the modified microfibrillated plant fiber in Example 20.

The elastic modulus and tensile strength of the obtained dumbbell test piece were measured in the same manner as in Example 1. Table 14 shows the measurement results.

TABLE 14

| | Modified microfibrillated plant fiber | | | Resin molded article | | | |
| --- | --- | --- | --- | --- | --- | --- | --- |
| Example | DS | Solvent contained | Modification of carboxyl group | Proportion of modified microfibrillated plant fiber (mass %) | Antioxidant (mass %) | Elastic modulus (GPa) | Tensile strength (MPa) |
| Example 20 | 0.41 | IPA | Methyl | 19.5 | — | 2.81 | 50.4 |
| Example 21 | 0.41 | IPA | Methyl | 19.5 | 0.33 | 3.25 | 55.2 |
| Comparative Example 14 | — | — | — | — | — | 1.83 | 41.5 |

Results and Discussion

The results show that both the elastic modulus and tensile strength were enhanced in Example 20, in which microfibrillated plant fiber was modified with thermally degraded PP-ASA and formed into a composite with PP, and in Example 21, in which microfibrillated plant fiber was modified with thermally degraded PP-ASA and an antioxidant was added when kneading was performed, compared to Comparative Example 14, which used PP alone.

Example 22

In the preparation of ASA-modified microfibrillated plant fiber in Example 3, after the reaction of microfibrillated plant fiber with ASA, the reaction mixture was washed successively with acetone, ethanol, acetic acid water, and water, and the solvent was replaced with IPA to obtain an IPA-containing ASA-modified microfibrillated plant fiber. The modified microfibrillated plant fiber had a degree of substitution (DS) of 0.18. After 91 g (solids content: 13.6 g) of the microfibrillated plant fiber was placed into a Trimix TX-1 (produced by Inoue Manufacturing Inc.), 40 g of NMP was added. The mixture was heated to 50° C. with stirring under reduced pressure to distill off IPA.

Subsequently, 8.7 g of benzoyl chloride and 22.6 g of dimethylaminopyridine were added to the test sample, and a reaction was allowed to proceed at 70° C. for 3 hours. After the reaction, the reaction mixture was washed successively with acetone, ethanol, acetic acid water, and water, and the solvent was replaced with IPA to obtain an IPA-containing ASA-modified benzoylated microfibrillated plant fiber. The obtained modified microfibrillated plant fiber (DS) had a degree of benzoyl substitution of 0.15. A dumbbell test piece was obtained by forming a composite of modified microfibrillated fiber and resin and molding in the same manner as in Example 19 except that the obtained modified microfibrillated fiber was used.

Based on solids, the proportions of components in the final resin composition are as follows.

ASA-modified benzoylated microfibrillated plant fiber: 14.5 mass % (microfibrillated plant fiber-derived portion (10 mass %)+ASA-derived portion (3.6 mass %)+benzoyl-derived portion (0.9 mass %), and
  resin: HDPE (85.5 mass %)

The elastic modulus and tensile strength of the obtained dumbbell test piece was measured in the same manner as in Example 1. Table 15 shows the measurement results.

Example 23

In the preparation of ASA-modified microfibrillated plant fiber in Example 3, after the reaction of microfibrillated plant fiber with ASA, the reaction mixture was washed successively with acetone, ethanol, acetic acid water, and water, and the solvent was replaced with IPA to obtain an IPA-containing ASA-modified microfibrillated plant fiber. The modified microfibrillated plant fiber had a degree of substitution (DS) of 0.35. After 113 g (solids content: 17 g) of the modified microfibrillated plant fiber was placed into a Trimix TX-1 (produced by Inoue Manufacturing Inc.), 40 g of NMP was added. The mixture was heated to 50° C. with stirring under reduced pressure to distill off IPA.

Subsequently, 2.5 g of acetic anhydride and 2.6 g of potassium carbonate were added to the test sample, and a reaction was allowed to proceed at 65° C. for 4 hours. After the reaction, the reaction mixture was washed successively with acetone, ethanol, acetic acid water, and water, and the solvent was replaced with IPA to obtain an IPA-containing ASA-modified acetylated microfibrillated plant fiber. The obtained modified microfibrillated plant fiber (DS) had a degree of acetyl substitution of 0.20. A dumbbell test piece was produced by forming a composite of modified microfibrillated fiber and resin and molding in the same manner as in Example 19 except that the obtained modified microfibrillated fiber was used.

Based on solids, the proportions of components in the final resin composition are as follows.

ASA-modified acetylated modified microfibrillated plant fiber: 17.5 mass % (microfibrillated plant fiber-derived component) (10 mass %)+ASA-derived component (7.0 mass %)+acetyl-derived component (0.5 mass %); and
  resin: HDPE (82.5 mass %).

The elastic modulus and tensile strength of the obtained dumbbell test piece were measured in the same manner as in Example 1. Table 15 shows the measurement results.

Example 24

113 g (solids: 17 g) of the IPA-containing ASA-modified microfibrillated plant fiber obtained in Example 23 was additionally modified with 13.5 g of anhydrous myristic acid. An IPA-containing ASA-modified myristoylated microfibrillated plant fiber was obtained in the same manner as in Example 23 except that anhydrous myristic acid was used in place of acetic anhydride as a modifying agent for the additional modification. The obtained modified microfibrillated plant fiber had a degree of ASA substitution (DS) of 0.35 and a degree of myristoyl substitution (DS) of 0.22. A dumbbell test piece was obtained by forming a composite of modified microfibrillated plant fiber and resin and molding in the same manner as in Example 19 except that the obtained modified microfibrillated plant fiber was used.

Based on solids, the proportions of components in the final resin composition are as follows.

ASA-modified myristoylated microfibrillated plant fiber: 19.9 mass % (microfibrillated plant fiber-derived component (10 mass %)+ASA-derived component (7.0 mass %)+myristoyl-derived component (2.9 mass %), resin: HDPE (80.1 mass %)

The elastic modulus and tensile strength of the obtained dumbbell test piece were determined in the same manner as in Example 1. Table 15 shows the measurement results.

TABLE 15

| | Modified microfibrillated plant fiber | | | | Resin molded article | | |
|---|---|---|---|---|---|---|---|
| | DS | | | | Proportion of modified | | |
| Example | ASA | Another modifying agent | Solvent contained | Modification of carboxyl group | microfibrillated plant fiber (mass %) | Elastic modulus (GPa) | Tensile strength (MPa) |
| Example 22 | 0.18 | 0.15 (Benzoyl) | IPA | H | 14.5 | 2.56 | 51.5 |
| Example 23 | 0.35 | 0.20 (Acetyl) | IPA | H | 17.5 | 2.70 | 48.3 |
| Example 24 | 0.35 | 0.22 (Myristoyl) | IPA | H | 19.9 | 1.93 | 43.2 |
| Comparative Example 2 | — | — | — | — | — | 0.82 | 23.4 |
| Comparative Example 3 | 0 | — | EtOH | — | 10 | 1.64 | 37.8 |

Results and Discussion

The results of Examples 22, 23, and 24 clearly show that even when a composite was formed using HDPE and a modified microfibrillated plant fiber that was modified with ASA and with another modifying agent, both the elastic modulus and tensile strength were enhanced, compared to Comparative Example 2, which used HDPE lone or to Comparative Example 3, in which a composite was formed using HDPE and unmodified NBKP.

The invention claimed is:

1. A method for producing a resin composition comprising the step of:
   (1) mixing a thermoplastic resin or thermosetting resin (A) with modified microfibrillated plant fiber (B) or modified plant fiber (b) in the presence of an organic liquid (C),
   the modified microfibrillated plant fiber (B) or modified plant fiber (b) being obtained by modification with an alkyl or alkenyl succinic anhydride in a liquid capable of swelling microfibrillated plant fiber (B') or plant fiber (b'),
   the thermoplastic resin in the resin composition being in the form of lamellae that are layered in a direction different from the fiber length direction of the modified microfibrillated plant fiber (B),
   the composition comprising resin fibrous cores that are uniaxially oriented in the fiber length direction of the modified microfibrillated plant fiber (B),
   the resin lamellae being layered between the modified microfibrillated plant fiber (B), and
   the fibrous cores in a direction different from the fiber length direction of the modified microfibrillated plant fiber (B).

2. The method according to claim 1, further comprising the step of (2) kneading the mixture obtained in step (1).

3. The method according to claim 2, wherein the modified microfibrillated plant fiber (B) or modified plant fiber (b) in step (1) is modified plant fiber (b), and during the kneading in step (2), the modified plant fiber (b) is defibrated in the thermoplastic resin or thermosetting resin (A) and the modified microfibrillated plant fiber (B) is dispersed in the thermoplastic resin or thermosetting resin (A).

4. The method for producing a resin composition according to claim 2, wherein step (2) is a step in which the mixture obtained in step (1) is further kneaded in the presence of an antioxidant.

5. The method for producing a resin composition according to claim 1, wherein the liquid capable of swelling microfibrillated plant fiber (B') or plant fiber (b') is at least one member selected from the group consisting of amide solvents and sulfoxide solvents.

6. The method for producing a resin composition according to claim 1, wherein the organic liquid (C) is at least one member selected from the group consisting of lower alcohols, esters, hydrocarbons, ketones, and ethers.

7. The method for producing a resin composition according to claim 1, wherein carboxyl group in the modified microfibrillated plant fiber (B) or modified plant fiber (b) is unmodified or modified into a carboxylate, carboxyamide, or alkoxycarbonyl group.

8. The method for producing a resin composition according to claim 7, wherein the carboxylate is an alkaline earth metal salt.

9. The method for producing a resin composition according to claim 1, wherein the amount of the modified microfibrillated plant fiber (B) or modified plant fiber (b) is 0.1 to 1,000 parts by mass per 100 parts by mass of the thermoplastic resin or thermosetting resin (A).

10. The method for producing a resin composition according to claim 1, wherein the modified microfibrillated plant fiber (B) or modified plant fiber (b) in step (1) is obtained by subjecting the microfibrillated plant fiber (B') or plant fiber (b') to modification with the alkyl or alkenyl succinic anhydride and to acylation.

11. A resin composition produced by using the method according to claim 1.

12. A resin molding material comprising the resin composition according to claim claim 11.

13. A resin molded article obtained by molding the resin molding material according to claim 12.

14. A method for producing a resin composition comprising the steps of:
(1) mixing a thermoplastic resin or thermosetting resin (A) with modified plant fiber (b) in the presence of water (C'), the modified plant fiber (b) being obtained by modification with an alkyl or alkenyl succinic anhydride in a liquid capable of swelling plant fiber (b'); and
(2) further kneading the mixture obtained in step (1), wherein during the kneading in step (2), the modified plant fiber (b) is defibrated in the thermoplastic resin or thermosetting resin (A), and the modified microfibrillated plant fiber (B) is dispersed in the thermoplastic resin or thermosetting resin (A),
the thermoplastic resin in the resin composition being in the form of lamellae that are layered in a direction different from the fiber length direction of the modified microfibrillated plant fiber (B),
the composition comprising resin fibrous cores that are uniaxially oriented in the fiber length direction of the modified microfibrillated plant fiber (B),
the resin lamellae being layered between the modified microfibrillated plant fiber (B), and
the fibrous cores in a direction different from the fiber length direction of the modified microfibrillated plant fiber (B).

15. The method for producing a resin composition according to claim 14, wherein the modified plant fiber (b) in step (1) is obtained by subjecting the plant fiber (b') to modification with the alkyl or alkenyl succinic anhydride and to acylation.

16. A resin composition comprising a thermoplastic resin and modified microfibrillated plant fiber (B),
the modified microfibrillated plant fiber (B) being obtained by subjecting microfibrillated plant fiber (B') to modification with an alkyl or alkenyl succinic anhydride,
the modified microfibrillated plant fiber (B) being obtained by modifying microfibrillated plant fiber (B') with an alkyl or alkenyl succinic anhydride,
the thermoplastic resin in the resin composition being in the form of lamellae that are layered in a direction different from the fiber length direction of the modified microfibrillated plant fiber (B),
the composition comprising resin fibrous cores that are uniaxially oriented in the fiber length direction of the modified microfibrillated plant fiber (B),
the resin lamellae being layered between the modified microfibrillated plant fiber (B) and the fibrous cores in a direction different from the fiber length direction of the modified microfibrillated plant fiber (B).

17. The resin composition according to claim 16, wherein the modified microfibrillated plant fiber (B) is obtained by subjecting the microfibrillated plant fiber (B') to modification with the alkyl or alkenyl succinic anhydride and to acylation.

18. A resin composition comprising a thermoplastic resin, and modified microfibrillated plant fiber (B) and/or modified plant fiber (b) according to claim 16, the modified microfibrillated plant fiber (B) and modified plant fiber (b) being obtained by subjecting microfibrillated plant fiber (B') and/or plant fiber (b') to modification with an alkyl or alkenyl succinic anhydride and to acylation.

19. The resin composition according to claim 16, wherein the thermoplastic resin is at least one resin selected from the group consisting of polyolefin resins, polyamide resins, polyester resins, and polyacetal resins.

20. The resin composition according to claim 19, wherein the polyolefin resins are polyethylenes.

21. The resin composition according to claim 16, further comprising an antioxidant.

22. A resin molding material comprising the resin composition according to claim 16.

23. A resin molded article obtained by molding the resin molding material according to claim 22.

* * * * *